(12) United States Patent
Baroudi et al.

(10) Patent No.: US 10,009,783 B2
(45) Date of Patent: Jun. 26, 2018

(54) ENERGY EFFICIENT DATA COLLECTION ROUTING PROTOCOL FOR WIRELESS RECHARGEABLE SENSOR NETWORKS

(71) Applicant: KING FAHD UNIVERSITY OF PETROLEUM AND MINERALS, Dhahran (SA)

(72) Inventors: Uthman A. Baroudi, Dhahran (SA); Tariq Mahmoud Ahmed Abu Amria, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 164 days.

(21) Appl. No.: 15/276,833

(22) Filed: Sep. 27, 2016

(65) Prior Publication Data
US 2018/0091989 A1 Mar. 29, 2018

(51) Int. Cl.
*H04W 24/08* (2009.01)
*H04W 4/00* (2018.01)
*H04W 24/02* (2009.01)
*H04W 4/70* (2018.01)

(52) U.S. Cl.
CPC .......... *H04W 24/08* (2013.01); *H04W 4/005* (2013.01); *H04W 4/70* (2018.02); *H04W 24/02* (2013.01)

(58) Field of Classification Search
None
See application file for complete search history.

(56) References Cited

U.S. PATENT DOCUMENTS

| | | | | |
|---|---|---|---|---|
| 9,331,931 | B2* | 5/2016 | Hui | H04W 40/02 |
| 9,882,639 | B2* | 1/2018 | Ryan | H04B 10/116 |
| 2008/0253327 | A1* | 10/2008 | Kohvakka | H04W 16/14 |
| | | | | 370/330 |
| 2009/0147714 | A1 | 6/2009 | Jain et al. | |
| 2009/0322518 | A1 | 12/2009 | Liang et al. | |
| 2010/0302933 | A1* | 12/2010 | Sreenan | H04L 45/021 |
| | | | | 370/217 |
| 2011/0001612 | A1* | 1/2011 | Chung | G08B 25/10 |
| | | | | 340/286.02 |

(Continued)

OTHER PUBLICATIONS

M. Shanmukhi, et al., "A Survey on Energy Efficient Data Aggregation Protocols for Wireless Sensor Networks", International Journal of Applied Engineering Research, vol. 11, No. 10, 2016, pp. 6990-7002.

(Continued)

*Primary Examiner* — Eunsook Choi
(74) *Attorney, Agent, or Firm* — Oblon, McClelland, Maier & Neustadt, L.L.P.

(57) ABSTRACT

A system and method of determining a data collection routing protocol include the steps of perceiving a broadcast beacon message from an i-th sensor node located at an i-th sensor level by one or more sensor nodes at one or more other sensor levels of a divided WSN, wherein the i-th sensor level does not include a first sensor level of a sink sensor node; resetting the respective sensor level of the one or more sensor nodes to an (i+1)th sensor level; attempting to connect the i-th sensor node at the i-th sensor level to another sensor node located at an (i−1)th sensor level; and connecting the i-th sensor node to a parent sensor node at the i-th sensor level when certain conditions are met. These conditions are determined and analyzed locally at each sensor node.

20 Claims, 14 Drawing Sheets

(56) References Cited

U.S. PATENT DOCUMENTS

| | | | | |
|---|---|---|---|---|
| 2013/0121181 | A1* | 5/2013 | Kikuzuki | H04W 52/0222 |
| | | | | 370/252 |
| 2014/0355499 | A1 | 12/2014 | Akhlaq et al. | |
| 2015/0049644 | A1* | 2/2015 | Lee | H04W 72/0446 |
| | | | | 370/256 |
| 2018/0084627 | A1* | 3/2018 | Recker | H05B 37/0227 |

OTHER PUBLICATIONS

Hongyang Chen, et al., "Mobility-assisted Position Estimation in Wireless Sensor Networks", $14^{TH}$ IEEE International Conference on Parallel and Distributed Systems, 2008, pp. 607-614.

Rong Cui, et al., "Energy-efficient Routing Protocol for Energy Harvesting Wireless Sensor Network", Proceedings of ICCT, 2013, 5 pages.

Gina Martinez, et al., "Wastage-Aware Routing in Energy-Harvesting Wireless Sensor Networks", IEEE Sensors Journal, vol. 14, No. 9, Sep. 2014, pp. 2967-2974.

Yin Wu, et al., "Routing protocol based on genetic algorithm for energy harvesting-wireless sensor networks", IET Wireless Sensor Systems, www.ietdl.org, Jan. 4, 2013, 8 pages.

* cited by examiner

ENERGY EFFICIENT DATA COLLECTION ROUTING PROTOCOL FOR WIRELESS RECHARGEABLE SENSOR NETWORKS

STATEMENT OF ACKNOWLEDGEMENT

The work described herein was supported by the Deanship of Scientific Research at King Fahd University of Petroleum and Minerals under Grant RG1319-1.

BACKGROUND

A primary purpose of many wireless sensor networks (WSNs) is collecting information, such as temperature, humidity, vibration, pressure, etc. from a targeted area. The data flow in a WSN converges to a base station or to a data sink node. The data sink node takes the responsibility to forward this data to a control center. The sink node is usually not a major power concern, as compared to sensor nodes. Sensor node batteries need to be recharged or replaced periodically.

Replacing the batteries of sensor nodes after deployment can be a difficult task. One solution to avoid replacing the batteries is to use energy harvesting from ambient resources. However, an ambient resource tends to be intermittent. Therefore, sensor nodes use a super capacitor to store the harvested energy. The stored energy is used when the energy harvesting is low or unavailable.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

In one embodiment, a method of determining a data collection routing protocol includes the steps of sensing one or more beacon messages at a source sensor node from neighboring sensor nodes within a WSN; measuring, via the source sensor node a Received Signal Strength Indicator (RSSI) of the beacon messages from the neighboring sensor nodes; inputting the measured RSSI and data for an available energy, a harvested energy, a packet transmission energy, an energy harvesting rate, and a packet reception energy of the neighboring sensor nodes into a routing table stored in memory at the source sensor node; calculating a weighted RSSI for all entries of the routing table for child sensor nodes located at a lower sensor level from a source sensor node level; connecting the source sensor node to one of the child sensor nodes based upon the weighted RSSI and the data of the associated child sensor node; and connecting the source sensor node to a parent sensor node located within the source sensor node level when connecting the source sensor node to one of the child sensor nodes is not completed before a predetermined timeout.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of the features of the implementations described herein are shown and described in detail. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1:
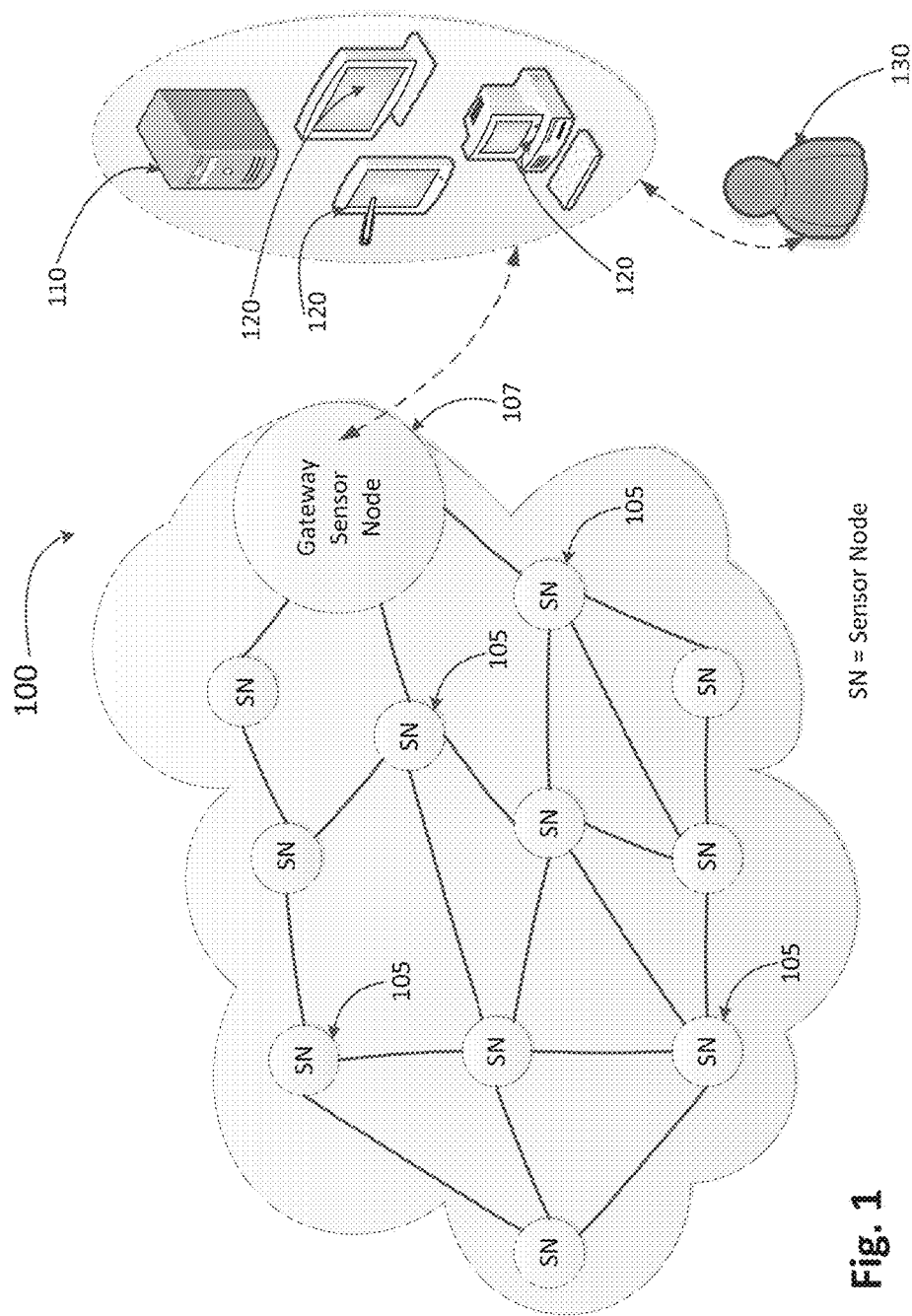
FIG. 1 illustrates an exemplary WSN architecture according to an embodiment.

FIG. 1 illustrates an exemplary WSN 100 as used with embodiments described herein. A WSN 100 includes a network of spatially distributed autonomous sensor nodes 105, each configured to monitor physical and/or environmental conditions, such as temperature, sound, and pressure. Each sensor node 105 cooperatively passes its data to an associated sensor node 105 and subsequently, through the network of sensor nodes 105 to a main location, such as a gateway sensor node 107. The network of sensor nodes 105 can be bi-directional, which enables the sensor nodes 105 to control sensor activity, as well as receive data.

Each sensor node 105 includes structural features for retrieving sensor data and passing the data to an adjacent sensor node 105. One or more sink nodes act as central sink node hubs for receiving data from surrounding sensor nodes 105, and eventually forwarding the received data to the gateway sensor node 107. Structural node features include a radio transceiver with an internal antenna or connection to an external antenna, a microcontroller, and an electronic circuit for interfacing with other sensor nodes 105 and to an energy source. The energy source can be a battery and/or an embedded form of energy harvesting. A sensor node 105 can vary in size depending upon purpose, cost, and energy requirements.

FIG. 1 also illustrates one or more servers 110 in which the WSN 100 is controlled. The one or more servers 110 can include a real-time server, a database server, a catalog server, and an application server, as well as other servers tailored to the specific design and purpose of the WSN 100. Each of the one or more servers 110 includes processing circuitry configured to execute processing steps of embodiments described herein.

The WSN 100 and associated architecture can be governed by an Open Systems Interconnection (OSI) model, which characterizes and standardizes the communication functions of a computing system. It provides the interoperability of diverse communication systems with standard protocols. The OSI model partitions a communication system into abstraction layers. A standard OSI model has seven layers. Each layer serves the layer above it and is served by the layer below it.

One of the layers in an OSI model is a network layer, which provides the functional and procedural means of transferring variable length data sequences from one node to another node, such as sensor nodes 105, connected within the same inter-connected network. Every node has an address, which permits each node connected to it to transfer messages to other nodes connected within the network by merely providing the content of a message and the address of the destination node. The network delivers the message to the destination node by routing it through one or more intermediate nodes.

FIG. 1 also illustrates various client devices 120 in which a user 130 has access to the WSN 100. Connections between the user 130 and the client devices 120 and/or the server 110 can be wired connections and/or wireless connections. Likewise, the connection between the gateway sensor node 107 and the client devices 120 and/or the server 110 can be wired connections and/or wireless connections.

The topology of the WSN 100 can vary from a simple star network to an advanced multi-hop wireless mesh network. FIG. 1 illustrates just a few sensor nodes 105 for simplicity. However, embodiments described herein are not limited to a particular size, topology, or function of the WSN 100.

WSNs have become a preferred solution in many applications. One restriction in using WSNs is a limited power source of the sensor nodes because the sensor nodes usually rely on batteries. Typically, a WSN deploys a large number of sensor nodes. When the batteries of the sensor nodes run out, they need to be replaced. The replacement process can be a costly process. Using an ambient resource such as solar, wind, etc. to power a WSN is a desirable solution.

Embodiments herein describe a Data Collection Energy-Efficient Routing Protocol (DEECP) with Harvested Energy. The node's energy, energy harvesting rate, packet data rate, and node capability build an efficient data tree for collecting data. Extensive simulation experiments have been conducted to study the behavior of DEECP. The simulation results demonstrate the effectiveness of DEECP.

In an embodiment, DEECP routing protocol operates in network layer three of an OSI model. However, DEECP is not limited to the OSI model. The children nodes connected to a parent node consider the transmission time based on its energy and other parameters used by DEECP. DEECP offers a more optimal routing protocol by expanding to the Media Access Control (MAC) layer, which is a lower sublayer of the data link layer two of the OSI model. The MAC layer provides addressing and channel access control mechanisms to other network nodes to communicate within a multiple access network. The MAC layer interfaces between a logical link control (LLC) sublayer and the network's physical layer (layer one).

DEECP grants a time slot to children nodes with an adequate packet rate. As a result, it can achieve a higher throughput and less delay. In addition, DEECP provides the ability to more efficiently manage harvested energy. As a result, the operation time of the WSN is extended.

WSNs can be supported by various energy harvesting sources, such as thermal, mechanical, and solar sources. A solar harvester tends to be an efficient source of energy as compared to other sources. A high efficiency solar cell designed for indoor light is presented in I. Mathews, G. Kelly, P. J. King, and R. Frizzell, "GaAs solar cells for Indoor Light Harvesting." in *proc. of 40th IEEE Photovoltaic Specialist Conference (PVSC)*, pp. 0510-0513, 2014, incorporated herein by reference in its entirety. The power density of a photovoltaic system, such as GaAs was found to be over 300% greater than dye sensitized solar cell (DSSC) modules under indoor light levels.

A routing algorithm that integrates the harvested energy from solar energy into a route decision was proposed by T. Voight, H. Ritter, and J. Schiller, "Utilizing solar power in wireless sensor networks," in *Proc. of 28th Annu. IEEE Int. Conf LCN*, pp. 416-422, October 2003, incorporated herein by reference in its entirety. The protocol classified sensor nodes as non-harvesting or harvesting nodes and attempted to avoid non-harvesting nodes as much as possible. See Yin Wu, Wenbo Liu, "Routing protocol based on genetic algorithm for energy harvesting-wireless sensor networks" *IET Wireless Sensor Systems*, doi: 10.1049/iet-wss.2012.0117, 2013, incorporated herein by reference in its entirety.

Unequal clustering and multi-hop routing can be used to manage an energy-harvested WSN. G. Martinez considers the energy wastage in a routing decision. See G. Martinez, S. Li, and C. Zhou, "Wastage-Aware Routing in Energy-Harvesting Wireless Sensor Networks" *IEEE SENSORS JOURNAL*, VOL. 14, NO. 9, pp. 2967-2974, September 2014, incorporated herein by reference in its entirety.

The energy wastage produced from overcharging of batteries having a finite capacity has been considered. S. Peng calculates the energy budget for a time slot. See S. Peng and C. P. Low, "Energy neutral routing for energy harvesting wireless sensor networks," in *Proc. IEEE WCNC*, pp. 2063-2067, April 2013, incorporated herein by reference in its entirety. When the node has an adequate energy budget, it implements packet relaying during the exploratory phase of direct diffusion. R. Cui takes into account three factors of wasted energy including energy consumption and transmission quality in order to choose the best path. See R. Cui, Z. Qu, S. Yin, "Energy-efficient Routing Protocol for Energy Harvesting Wireless Sensor Network," in *proc. of 5$^{th}$ IEEE International Conference on Communication Technology (ICCT)*, pp. 500-504, 17-19 Nov. 2013, incorporated herein by reference in its entirety.

Some objectives of embodiments described herein are to minimize energy consumption and end-to-end delay and to maximize the throughput. To help achieve these objectives, a single hop from the sensor node to the sink node is avoided and the node capacity is considered. The node capacity is defined as the ability of a sensor node to transmit a certain number of packets within a predefined energy budget for a defined period of time. Considering these two factors can lead to an evenly distributed load and a longer lifetime for a data path.

Figure 2A:
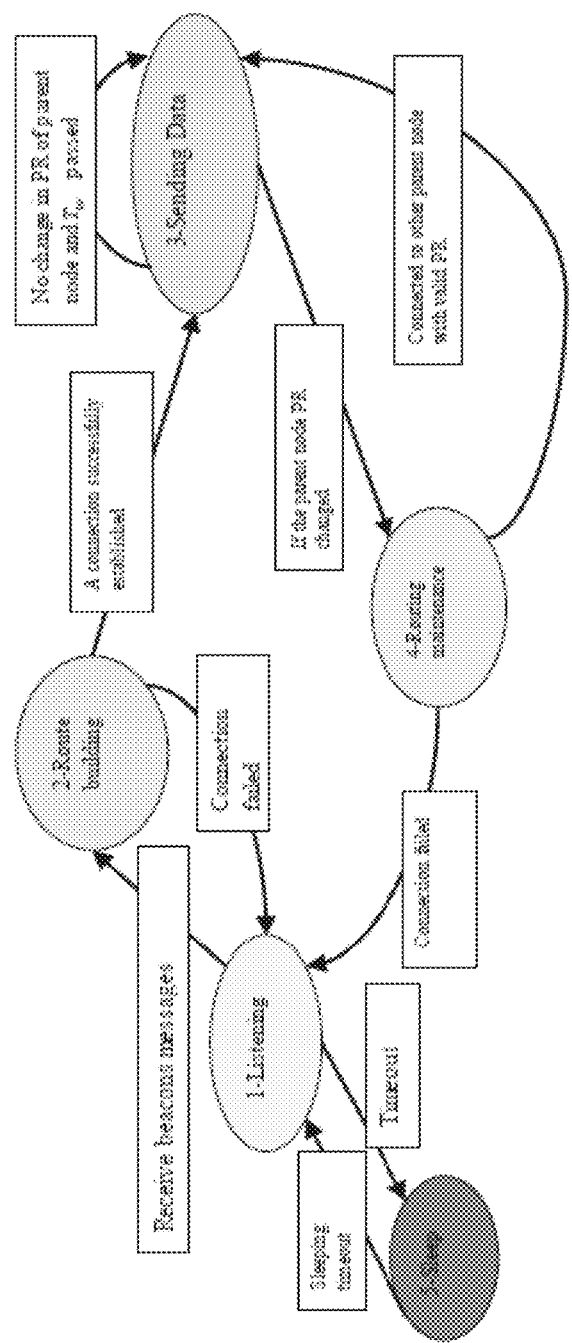
FIG. 2A illustrates a transition state diagram of sensor nodes according to an embodiment.

In the data collection routing protocol described herein, the sensor node can be at any of the following states. FIG. 2A illustrates a transition state diagram of sensor nodes, where a circle represents a state, a rectangle represents a condition, and an arrow represents an action.

1. Listening state (State 1). When a sensor node turns on, it has no information about its surrounding area. Throughout the disclosure, references made to "listening" performed by sensors of the sensor nodes refer to obtaining sensor data, such as perceiving an incoming signal from a nearby sensor node. The sensor node starts collecting beacon messages to form a routing table. A beacon message is a specific transmission used to identify and broadcast information about the operational status of the transmitting sensor node. If the sensor node does not receive any beacon message or fails to receive any updated beacon message, it goes to a sleep state (State 5).

2. Route building state (State 2). After a predetermined period of time, such as a few seconds in State 1, the sensor node goes to a route building state. The optimum route is determined based upon criteria described herein. This state is triggered by the end of State 1 when the sensor node receives any updates. If the sensor node is successfully connected to the parent node, it goes to a sending data (operation) state (State 3); otherwise, it returns to State 1.

3. Sending data (operation) state (State 3). If the sensor node is connected, it proceeds to this state. If there is no change in the packet rate (PR—defined hereunder in Eqn. 2) of the parent node or it hasn't received an abandon order from the parent node, it stays at this state; otherwise, it goes to the route maintenance state (State 4).

4. Route maintenance (State 4). In this state, the sensor node tries to join a new parent node while it is still joined to the old parent node. The sensor node enters this state when it receives an abandon order from the old parent node or when the connection to the old parent node is lost.

5. Sleep state (State 5). When the sensor node times out at State 1, it goes to the sleep state. The sensor node stays at the sleep state for a specific time and then returns to State 1.

A protocol used herein includes a tree-building phase and a data-transfer phase. A Received Signal Strength Indicator (RSSI) indicates the strength of a signal arriving at a receiver. The receiving sensor node measures the RSSI of the incoming signal of a beacon message from the transmitting sensor node. The RSSI is the basis for computing several parameters. A RSSI measurement can include the energy from the intended transmission, external noise, and concurrent interfering transmissions. In order to avoid temporary peaks in the RSSI value of received signals, most WiFi cards maintain an exponential weighted average as shown in Eq. 1.

$$RSSI_{new\ ave} = RSSI_{old\ ave} \cdot X + RSSI_{last\ measured} \cdot Y \quad (1)$$

X and Y represent weights for the old average RSSI and the newly measured RSSI, respectively. For example, Intel-2915 cards use X=0.9 and Y=0.1, and Y=1−X.

A node uses the RSSI in order to indicate the quality of a channel. Consequently, the neighboring nodes can receive the signal. However, a parameter is used to control the load associated with the served node (child node). This parameter represents the capability of the node to handle the load, which can be the PR. The definition of a packet rate is the number of packets that can be handled by a wireless sensor node in a given period of time, which can be referred to as a time window ($T_w$). The packet rate offered by a node depends on the current energy of the node, the harvested energy during a time window, the energy needed to transmit one packet, the energy harvesting rate, and the energy needed to receive one packet. The calculation of the packet rate (PR) is shown in Eq. (2).

$$PR = \frac{(E_t + EHR * T_w)}{(PRE + PTE) * T_w} \quad (2)$$

where PR is the number of packets that can be handled by the sensor node during a given time period; $E_t$ is the energy available in the node at time t; EHR is the energy harvesting rate; $T_w$ is the observation window; PRE is the packet received energy, and PTE is the packet transmitted energy.

In view of performance, the time window $T_w$ has a significant impact on the stability and adaptation of the network. If $T_w$ is very short, this will increase the consumed computation power because the sensor nodes need to check their routing tables at the end of each $T_w$ to look for updated information. Consequently, more protocol control messages come from the broadcasting beacon's messages. If $T_w$ is long, the adaptation of the network nodes will be slow in responding to the power change. $T_w$ must be long enough to contain a suitable number of data packets and control packets of the nodes. A transmission power model can be used, as shown in Eq.3

$$P(d) = \gamma + \alpha d^\beta \quad (3)$$

where $\gamma$ and $\alpha$ are system dependent parameters and $2 \le \beta \le 4$. In general, $\gamma$ is a small constant. See T. S. Rappaport, Wireless Communications: Principles and Practice. Prentice Hall, 1996, incorporated herein by reference in its entirety. The wireless sensor nodes are assumed to have the capability to adjust their transmission power. In consequence, every node has its own PTE.

By using a top-down approach, the network can be divided into multiple levels. Each level contains a number of nodes, where the first level at level 0 is the sink node. For every node that hears the beacon message from $level_i$, it will set its level value to $level_{i+1}$. All nodes at $level_i$ will try to connect to nodes in $level_{i-1}$. If the node is not successfully connected before a predefined timeout, it will try to connect to a parent node at the same level when the following conditions are satisfied: 1) the parent node has the maximum measured RSSI, and 2) the parent node has a large enough PR.

Initially, the sensor node tries to collect information from its neighboring nodes to fill its routing table. Every sensor node sends a beacon message to inform its neighboring sensor nodes (served child sensor nodes) about its path. The neighboring child sensor nodes measure the RSSI for all received signals that were generated from an origination sensor node (serving parent sensor node). Each child sensor node subsequently searches its routing table and chooses its parent sensor node if the following conditions are satisfied: 1) the parent sensor node has the maximum measured RSSI, 2) the Hop Count does not exceed a predetermined Max-Hop-Count, 3) the expected parent sensor node has more available PRs than the original sensor node needs, and 4) the expected parent sensor node has a connection to another sensor node as a destination. These conditions guarantee the direction of flow towards the sink node or the base station. If the sensor node fails to connect, it will go into a sleep state.

Embodiments herein describe a weighted RSSI, which takes into consideration the received RSSI, a correction factor, and the sensor node level. The weighted RSSI is calculated locally at each node and is applied to the computed RSSI for nodes of lower levels, as shown in Eq. (5).

$$RSSI_{weighted} = RSSI_{computed} * C_f + L \times L_w \qquad (5)$$

where $C_f$ is the correction factor for the RSSI, L is the level of the sensor node, and $L_w$ is a weight assigned to the level. The $RSSI_{weghted}$ value will be computed for all entries in the routing table that come from lower levels. If $L_w$ is set to a value larger than zero, this will encourage the sensor node to take the direct connection to other sensor nodes that have a lower level value.

The objective of the weighted RSSI is to shorten the path connecting the sensor node to the sink node. This is accomplished by encouraging a sensor node to take the path with a smaller hop count, when the difference between the RSSI from a sensor node at a lower level and a sensor node at the same level is not significant in terms of energy saved.

Weighting the RSSI will result in decreasing the number of hops and hence, minimizing the overall delay. When the sensor node is located away from the sink node at level 0, it will have a tendency to connect to sensor nodes at lower levels. The farther the sensor node is from the sink node, the lower the number of served children nodes. Consequently, its remaining energy is higher than other sensor nodes that are closer to the sink node. This concept is exploited in order to balance the energy consumption among all network nodes. This allows such nodes to transmit at a higher transmission power. Hence, the number of hops is reduced because a node with higher energy can make a bigger hop and skip over one or more nodes.

Figure 2B:
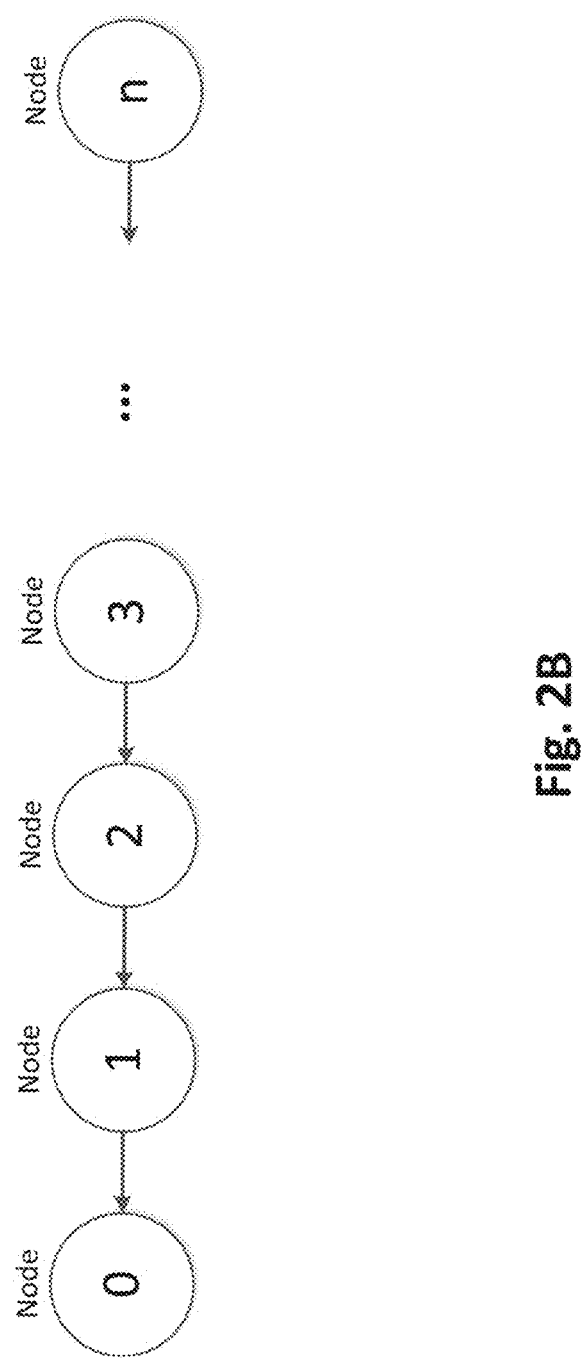
FIG. 2B illustrates an example of the energy levels of nodes with respect to the sink node according to an embodiment.

FIG. 2B illustrates an example of the energy levels of nodes with respect to the sink node. FIG. 2B illustrates a chain of nodes starting at the sink node (Node 0) to Node n. Node n is the child of Node (n−1), and Node (n−1) is the parent of Node n. Therefore, Node (n−1) will send all of its own data (n−1) plus the data from Node n towards the sink node (Node 0). Likewise, Node (n−2) will send all of its own data (n−2), the data from Node (n−1) and the data from Node n towards the sink node (Node 0). As a result, Node 1 (closest to the sink node) will send data from all of its children (Nodes 2, 3, . . . n). Therefore, the child nodes farther away from the sink node (towards the right in FIG. 2B) will consume a lower and lower amount of energy. For example, Node n in FIG. 2B will consume the least amount of energy.

In order to decrease the number of outages and the packet loss, the sensor node monitors its power capability and as a result, it determines its available packet rate (PR). If the value of the PR decreases below the value assigned to its children by a predetermined amount, the sensor node starts retrieving unused PRs from its children. First, the parent node requests its children's nodes to return all unused PRs. Second, if the retrieved unused PRs are not enough to extend the life of the parent node, the parent node requests its children to choose another parent node. In that process, children nodes start exchanging messages to join to a new parent node. Consequently, the children nodes connect to the new parent node before disconnecting from the old parent node. The process of parent replacement is called a soft handover process, where the packet delivered from the child node is not interrupted.

The probability of sensor nodes that are distant from the sink node initializing a connection with a parent node becomes low when the density of the network exceeds a predetermined level. In the case of a low harvesting rate, the nodes closer to the sink node become weak and they cannot serve distant sensor nodes. In addition, the misconfiguration of an on-off threshold of the sensor nodes and an increase in the application data rate (ADR) will weaken the sensor nodes closer to the sink node as described herein. As a result, the coverage area of the network will shrink and the number of power outages will increase.

To address the problem described above, a relative on-off threshold can be used, where every parent node goes to sleep for some time to store enough energy until it can support its children nodes. The relative on-off threshold is related to the sensor node capability and the ADR. The node energy capability of the PR (packet rate) on the observation window was previously described. The node sends an amount of data in $T_w$, depending on the ADR. Therefore, the calculated application PR (APR) is compared with the PR in $T_w$, as shown in Eq. 6

$$APR = \frac{(\text{Application data rate (bps)})}{\text{paket length}} \qquad (6)$$

The off-threshold is configured by the predefined value of the stored energy level, so that the sensor node does not completely deplete its energy. The on-threshold is defined as the minimum PR needed by a parent sensor node to serve its children sensor nodes for at least one $T_w$ to run after the state goes to the on-mode, as shown in Eq. 7, where A is derived from the historical total number of joined sensor nodes.

$$\text{Available } PR_i \geq \sum_{j=i+1}^{A} APR_j \qquad (7)$$

$APR_i$ represents the parent packet rate at the i-th level, $APR_j$ represents the APR of the jth child, and N represents the number of children nodes. Eq. 7 assumes the minimum PR needed by a sensor node is APR.

Network Simulator version 3 (NS-3) is a discrete event simulator used for testing embodiments described herein. Parameters and values of NS-3 are illustrated in Table 1.

TABLE 1

| Simulation Parameter | |
| --- | --- |
| Parameter | Value |
| Test Area | 500 m * 500 m |
| Number of nodes | 10, 15, 20, and 30. |
| Placement | Uniformly random placement |
| Radio range | 100 m |
| Transmission bandwidth | 11 Mbps |
| Application traffic | ON/OFF source; $T_{ON}$ = 2 sec. |
| | $T_{OFF}$ = 2 sec. |
| | Data Rate: 20 Kbps, 50 kbps, and 80 kbps. |

TABLE 1-continued

Simulation Parameter

| Parameter | Value |
|---|---|
| Transport Protocol | UDP |
| Initial Energy | 0.02 J |
| Number of sources | Number of nodes −1 |
| Packet size | 64 Bytes |
| Energy harvesting | minhp: 0, maxhp: [0.2 mW-0.8 mW] |
| Routing protocol | DEECP and AODV |
| Simulation time | 900 sec |
| $T_w$ | 0.5, 1, 2, 3, 4, 5, 6 seconds |
| Scenario replications | 30 |

Figure 3:
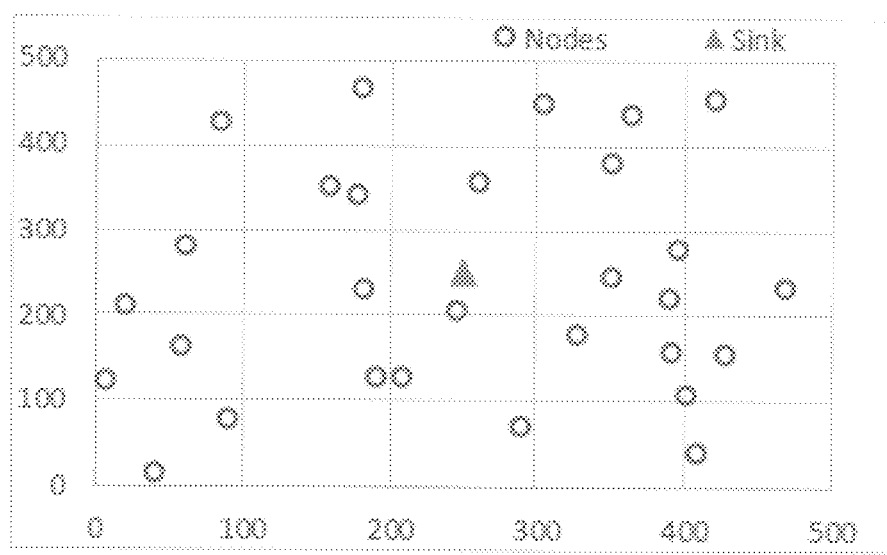
FIG. 3 illustrates a snapshot of thirty sensor nodes used in a network simulator according to an embodiment.

Sensor nodes are distributed randomly in the test area. The sink node is placed at the center of the test area. The sensor nodes are stationary. One sink node application is installed in the central sink node. All other sensor nodes are sources of exchanged traffic. Each source node has data to send to the sink node at a constant bit rate. The source nodes start sending their data to the sink node at the beginning of the simulation period and stop when the simulation period ends. FIG. 3 illustrates a snapshot of thirty sensor nodes (one sink node and twenty nine sources of traffic) used in the NS-3. The simulation experiments were repeated at least thirty times to achieve at least a 95% level of confidence.

NS-3 has an energy model which was added to NS-3 version 3.9. The energy framework of NS-3 includes two basic models described below. See NS-3 document site: https://www.nsnam.org/, incorporated herein by reference in its entirety.

Energy source model represents the sensor node energy supply source. Examples include Li-ion models, linear, and RV battery models, which implement an analytical non-linear battery model.

Device energy model, such as Wi-Fi radio model, represents the Wi-Fi radio energy consumption of the sensor node. An energy-harvesting model was implemented in NS-3.22. Periodically, this model adds a uniformly distributed preconfigured value to the remaining energy of the energy source (configured default value is one second). The harvesting rate is configured by two parameters of a minimum harvestable power (minhp) and a maximum harvestable power (maxhp). The actual energy harvested every second is a uniformly distributed value, which lies between minhp and maxhp, wherein $$EH(t)=\text{Uniform}[minhp,maxhp] \quad (8)$$

The available energy in a sensor node in idle time, i.e. no energy consumption, can be represented as a function of time, as follows:

$$AE(t) = \sum_{0}^{t} EH_t + IE; t = 0, 1, 2 \ldots \quad (9)$$

where AE(t) is the available energy at time t, IE is the initial energy.

The energy resource is a major issue in DEECP. An energy model and energy harvesting model were installed on the sensor nodes. The sensor nodes in the simulation start with an initial amount of energy to initiate the communication between the sensor nodes. According to the energy device model parameters, the sensor node starts to consume a significant amount of energy when it starts to transmit or receive data. The parameters that affect the amount of energy consumption are compatible with a CC2420 radio chip. See CC2420 Datasheet: http.//www.ti.com/product/CC2420/technicaldocuments, incorporated herein by reference in its entirety.

The energy harvesting model was installed on all of the sensor nodes in the network. The minimum power harvesting rate and maximum power harvesting rate parameters control the amount of the harvested energy. The minimum harvesting power rate was set to zero for all sensor nodes, while the maximum harvesting power rate was set randomly between 0.2 mW to 0.8 mW, so as to differ from sensor node to sensor node. The minimum harvesting power rate and the maximum harvesting power rate were uniformly distributed. The amount of harvested energy for a sensor node in the entire simulation was computed as shown in Eqn. (10).

$$\text{Totl HE}=\text{Sim. Time}*\text{Avg}(minhp,maxhp) \quad (10)$$

The performance of a Wireless Mesh Network (WMN) as defined by IEEE 802.11 is compared herein with DEECP. A WMN has routing capabilities using the MAC layer. The WMN has a proactive mode in which the protocol builds a tree to collect data to forward to a sink node. IEEE 802.11 defines a mandatory profile of Hybrid Wireless Mesh Protocol (HWMP) as a path discovery mechanism and an Airtime Link Metric (ALM) as a path selection metric. Both protocols operate on sensor nodes using harvested energy. Table 2 illustrates the simulation parameters and associated values.

TABLE 2

Simulation Parameters

| Parameter | Value |
|---|---|
| Number of nodes | 10 |
| Placement | Random placement. |
| Simulation Time | 900 seconds. |
| Initial Energy | 0.02 J for harvesting case and 1.8/number of nodes for battery case |
| Application Data Rate | 5 kbps, 10 kbps, 20 kbps, 80 kbps. |
| | On off application: 2 sec on, 2 sec off. |
| Protocol | DEECP, WMN with routing capabilities of MAC layer (proactive mode) |
| Replications | 60 |
| Channel type | OFDM Rate 6 Mbps |
| Number of sources | 1 node |

Figure 4:
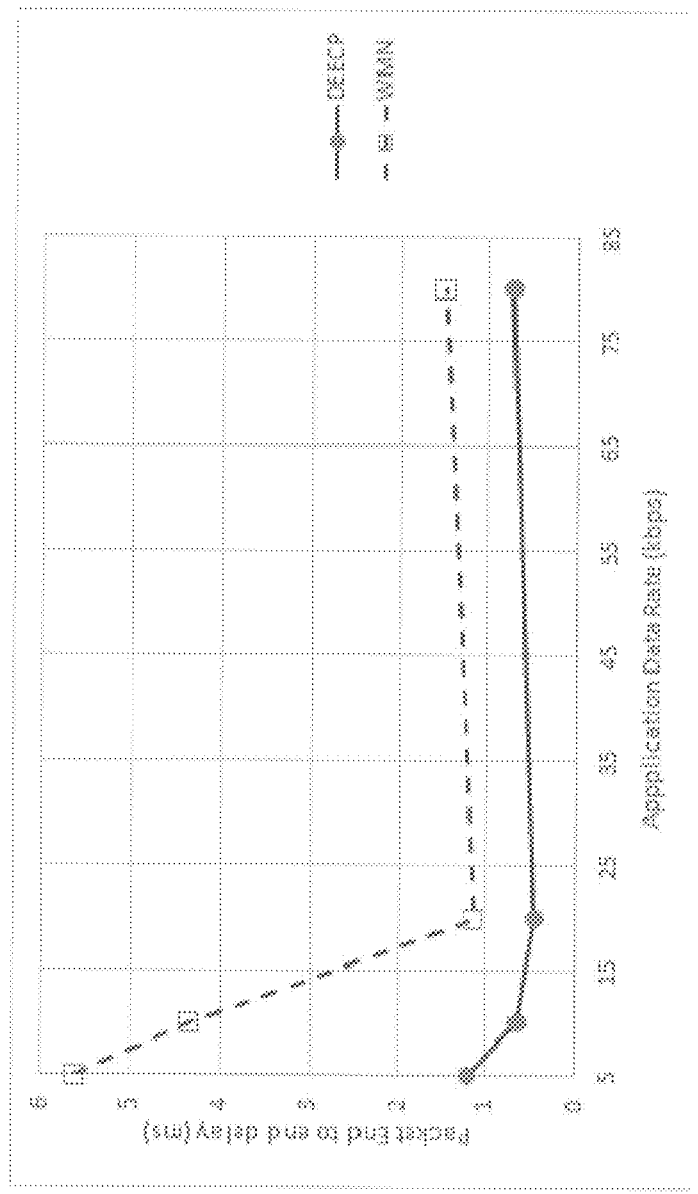
FIG. 4 is a graph illustrating a packet end-to-end delay according to an embodiment.

FIG. 4 is a graph illustrating the average packet end-to-end delay of data flow at ten sensor nodes (vertical axis) to the ADR in kbps (horizontal axis) for Ad hoc On-Demand Distance Vector (AODV) routing protocol of the WMN and for DEECP protocol using the parameter values illustrated in Table 2. The packet end-to-end delay of the WMN with a proactive mode is higher than the packet end-to-end delay for DEECP. FIG. 4 is a graph illustrating the packet end-to-end delay, which decreases as the ADR increases until the ADR reaches about 20 kbps. After 20 kbps, the end-to-end delay gradually increases as the ADR increases because the packet loss ratio also increases. Table 3 illustrates a full factorial analysis of the effects of the topology on packet end-to-end delay for WMN and DEECP. FIG. 4 and Table 3 illustrate that DEECP has a packet end-to-end delay approximately 76.8% lower than WMN.

TABLE 3

Computation of the Effects of Topology on End-to-End Delay.

| App. Rate (Kbps) | DEECP | WMN | Row Sum | Row Mean | Row Effect |
|---|---|---|---|---|---|
| 5 | 1.2131528 | 5.6387188 | 6.851872 | 3.425936 | 1.483161 |
| 10 | 0.6666912 | 4.3203851 | 4.987076 | 2.493538 | 0.550763 |
| 20 | 0.471641 | 1.1437357 | 1.615377 | 0.807688 | −1.13509 |
| 80 | 0.576588 | 1.5112896 | 2.087878 | 1.043939 | −0.89884 |
| Column Sum | 2.928073 | 12.614129 | | | |
| Column Mean | 0.7320182 | 3.1535323 | | | |
| Column Effect | −1.210757 | 1.210757 | | 1.942775 | |

Figure 5:
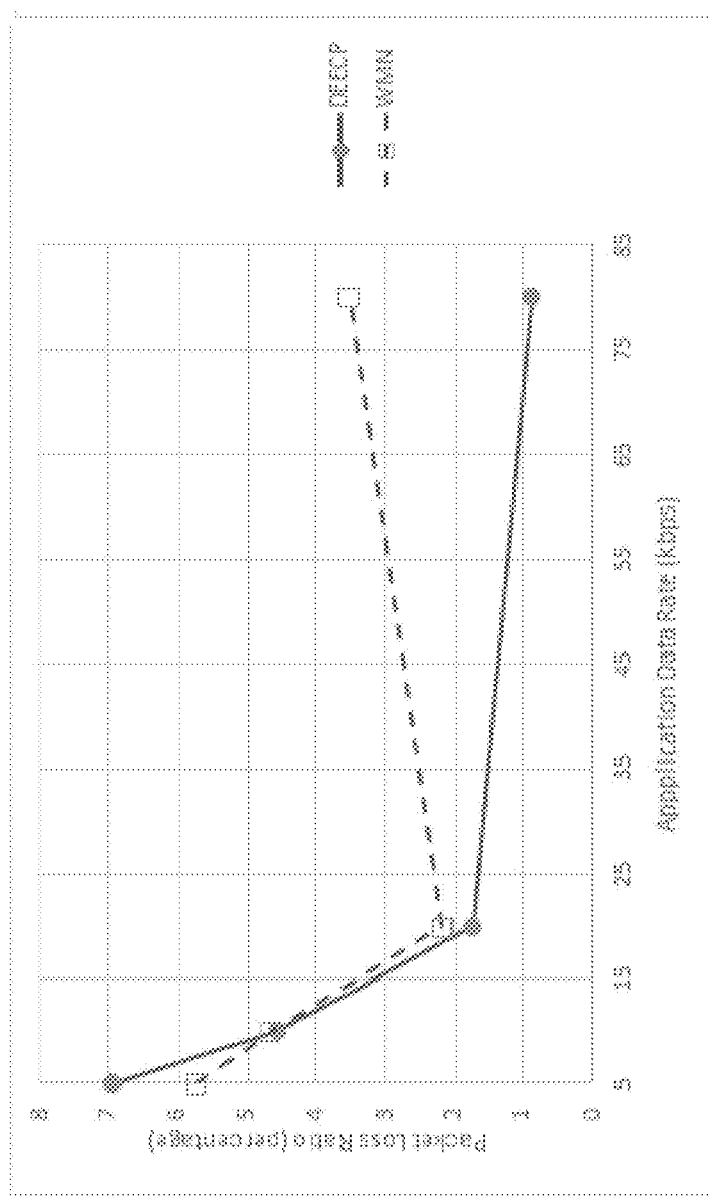
FIG. 5 is a graph illustrating an average packet loss ratio of data flow according to an embodiment.

FIG. 5 is a graph illustrating the average packet loss ratio of data flow of ten sensor nodes (vertical axis) compared to the ADR in kbps (horizontal axis) for the WMN and DEECP. The average packet loss ratio decreases as the ADR increases until the throughput reaches a high utilization point. The peak utilization point for the WMN is at 20 kbps, and its packet loss ratio increases thereafter. The DEECP has a higher packet loss ratio at lower ADRs, but it has a lower packet loss ratio than WMN at a higher ADR, due to using relative on-off thresholds. Table 4 illustrates a full factorial analysis of the effect of topology on the packet loss ratio for DEECP and WMN protocols. FIG. 5 and Table 4 illustrate that DEECP has a packet loss ratio lower than WMN by about 9.7%.

TABLE 4

Computation of Effects of Topology on Packet Loss Ratio.

| App. Rate (Kbps) | DEECP | WMN | Row Sum | Row Mean | Row Effect |
|---|---|---|---|---|---|
| 5 | 6.9382764 | 5.7206151 | 12.65889 | 6.329446 | 2.499935 |
| 10 | 4.5833042 | 4.6610792 | 9.244383 | 4.622192 | 0.792681 |
| 20 | 1.7483729 | 2.1793082 | 3.927681 | 1.963841 | −1.86567 |
| 80 | 1.2710807 | 3.5340497 | 4.80513 | 2.402565 | −1.42695 |
| Column Sum | 14.541034 | 16.095052 | | | |
| Column Mean | 3.6352586 | 4.0237631 | | | |
| Column Effect | −0.194252 | 0.1942523 | | 3.829511 | |

Figure 6:
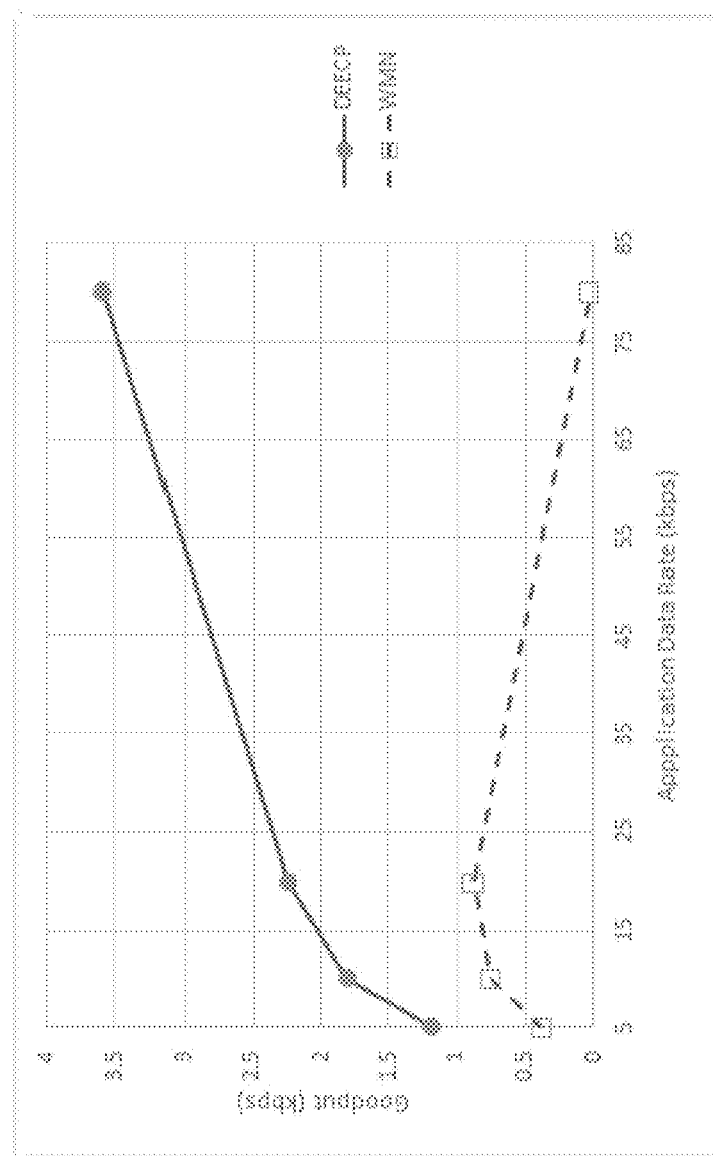
FIG. 6 is a graph illustrating an average throughput of data flow according to an embodiment.

FIG. 6 is a graph illustrating the average throughput of data flow in kbps of ten sensor nodes (vertical axis) compared to the ADRs (horizontal axis) for WMN and DEECP. The throughput for WMN increases as the ADR increases, until it reaches a peak utilization point. The throughput decreases after that point as the ADR increases. In contrast, the DEECP throughput continues to increase through 80 kbps. The DEECP outperformed WMN for all configured ADRs.

Figure 7:
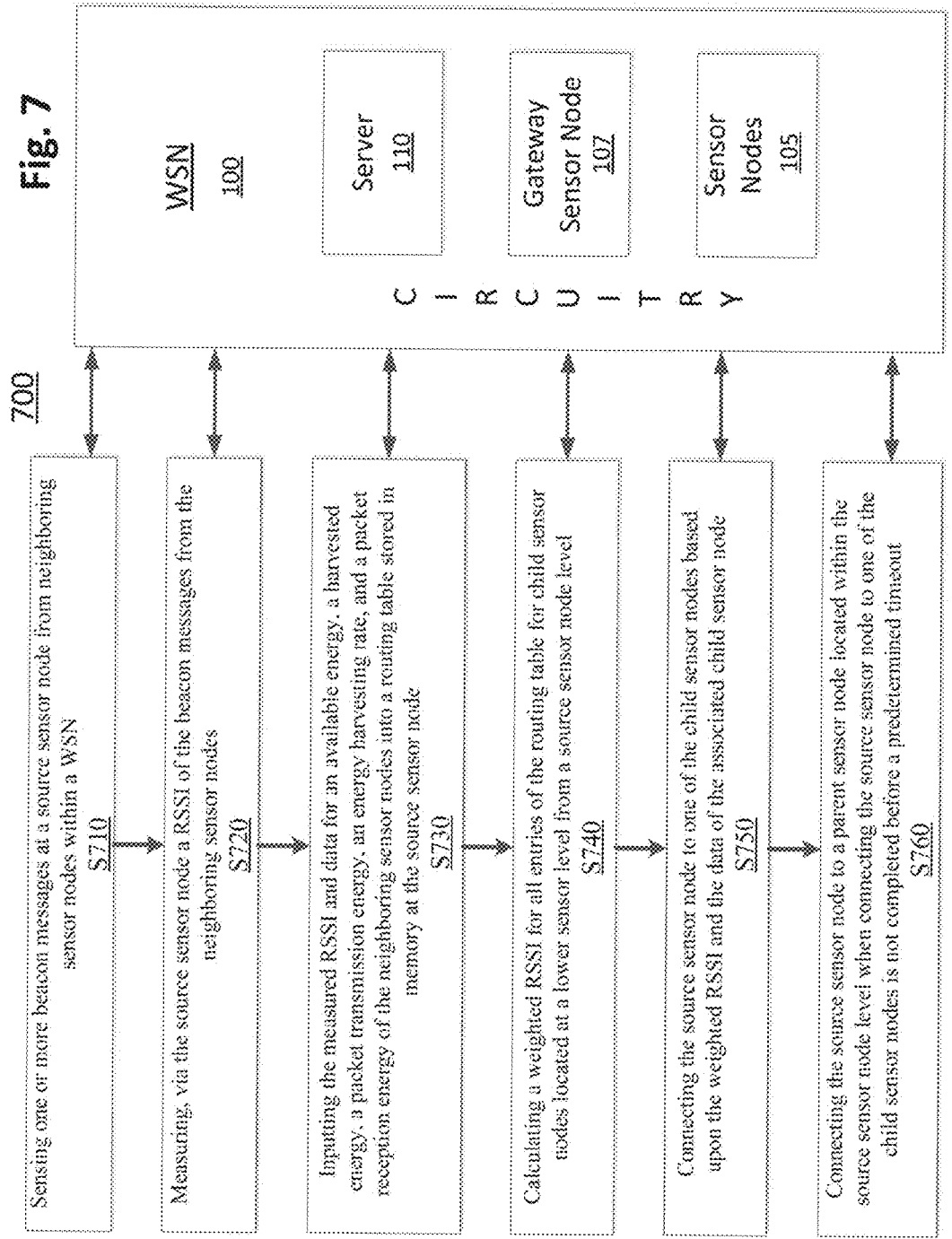
FIG. 7 is an exemplary algorithmic flowchart for a method of determining a data collection routing protocol according to an embodiment.

FIG. 7 is an exemplary algorithmic flowchart for a method 700 of determining a data collection routing protocol. Steps of method 700 are executed by processing circuitry of the WSN 100 including the WSN server 110, the gateway sensor node 107, and/or the plurality of interconnected sensor nodes 105, as described with reference to FIG. 1.

In step S710, method 700 includes sensing one or more beacon messages from neighboring sensor nodes at a source sensor node within a WSN. This includes listening to or perceiving an incoming signal of a beacon message from a nearby sensor node. A beacon message is a specific transmission used to identify and broadcast information about the operational status of the transmitting sensor node.

In step S720, a RSSI of the beacon messages from the neighboring sensor nodes is measured, via the source sensor node. A RSSI is based upon a received energy from the original transmission signal, a received external noise, and an energy received from concurrent interfering transmissions.

In step S730, the measured RSSI and data for an available energy, a harvested energy, a packet transmission energy, an energy harvesting rate, and a packet reception energy of the neighboring sensor nodes are inputted into a routing table stored in memory at the source sensor node. The data is used to determine the capability of a receiving sensor node to handle the load of a received signal. The PR is the number of packets that can be handled by a sensor node in a given period of time, which can be used to determine the capability.

In step S740, a weighted RSSI for all entries of the routing table for child sensor nodes located at a lower sensor level from a source sensor node level is calculated. The weighted RSSI is applied to the computed RSSI for sensor nodes at a lower level from the source sensor node. The weighted RSSI is a function of the level of the sensor node and a predetermined weight assigned to the sensor node level.

In step S750, the source sensor node is connected to one of the child sensor nodes based upon the weighted RSSI and the data of the associated child sensor node. Using a weighted RSSI results in decreasing the number of hops from one sensor node to another, which will minimize the overall delay by shortening the path connecting the sensor node to the sink sensor node.

In step S760, the source sensor node is connected to a parent sensor node located within the source sensor node level when connecting the source sensor node to one of the child sensor nodes is not completed before a predetermined timeout.

Figure 8:
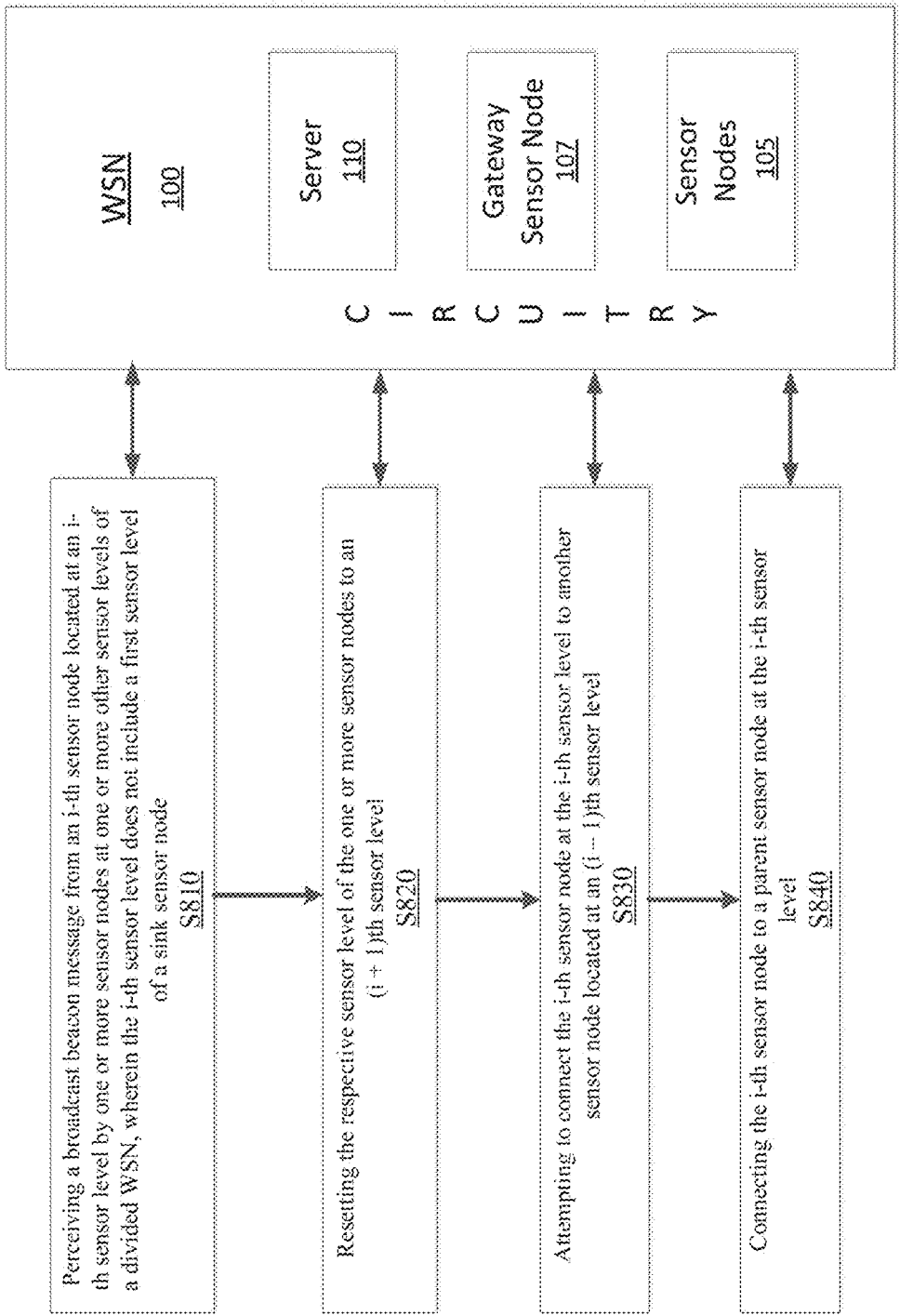
FIG. 8 is an exemplary algorithmic flowchart for a method of determining a data collection routing protocol according to an embodiment.

FIG. 8 is an exemplary algorithmic flowchart for a method 800 of determining a data collection routing protocol. Steps of method 800 are executed by processing circuitry of the WSN 100 including the WSN server 110, the gateway sensor node 107, and/or the plurality of interconnected sensor nodes 105, as described with reference to FIG. 1.

In step S810, a broadcast beacon message is perceived from an i-th sensor node located at an i-th sensor level by one or more sensor nodes at one or more other sensor levels of a divided wireless sensor network (WSN). In an embodiment, the WSN is structured as a tree network structure. Each level of the WSN includes a plurality of sensor nodes, except the sink sensor node at the first sensor level. The i-th sensor level does not include the first sensor level of the sink sensor node.

In step S820, the respective sensor level of the one or more sensor nodes is reset to an (i+1)th sensor level. Each sensor node that perceived the beacon message from the i-th sensor node is designated at one level above the i-th sensor node level.

In step S830, at attempt is made to connect the i-th sensor node at the i-th sensor level to another sensor node located at an (i−1)th sensor level. Connecting to a sensor node at a lower level from the i-th sensor node level forms a shortened path towards the sink sensor node located at the first level.

In step S840, the i-th sensor node is connected to a parent sensor node at the i-th sensor level. The i-th sensor node is connected to the parent sensor node at the i-th sensor level when the following conditions are satisfied: 1) the attempting is not completed before a predetermined timeout, 2) the parent sensor node has a maximum RSSI, 3) a hop count between the i-th sensor node and the parent sensor node does not exceed a maximum hop count, 4) the parent sensor node has a higher packet rate than needed, and 5) the parent sensor node has a connection to another sensor node within a destination of the i-th sensor node.

Figure 9:
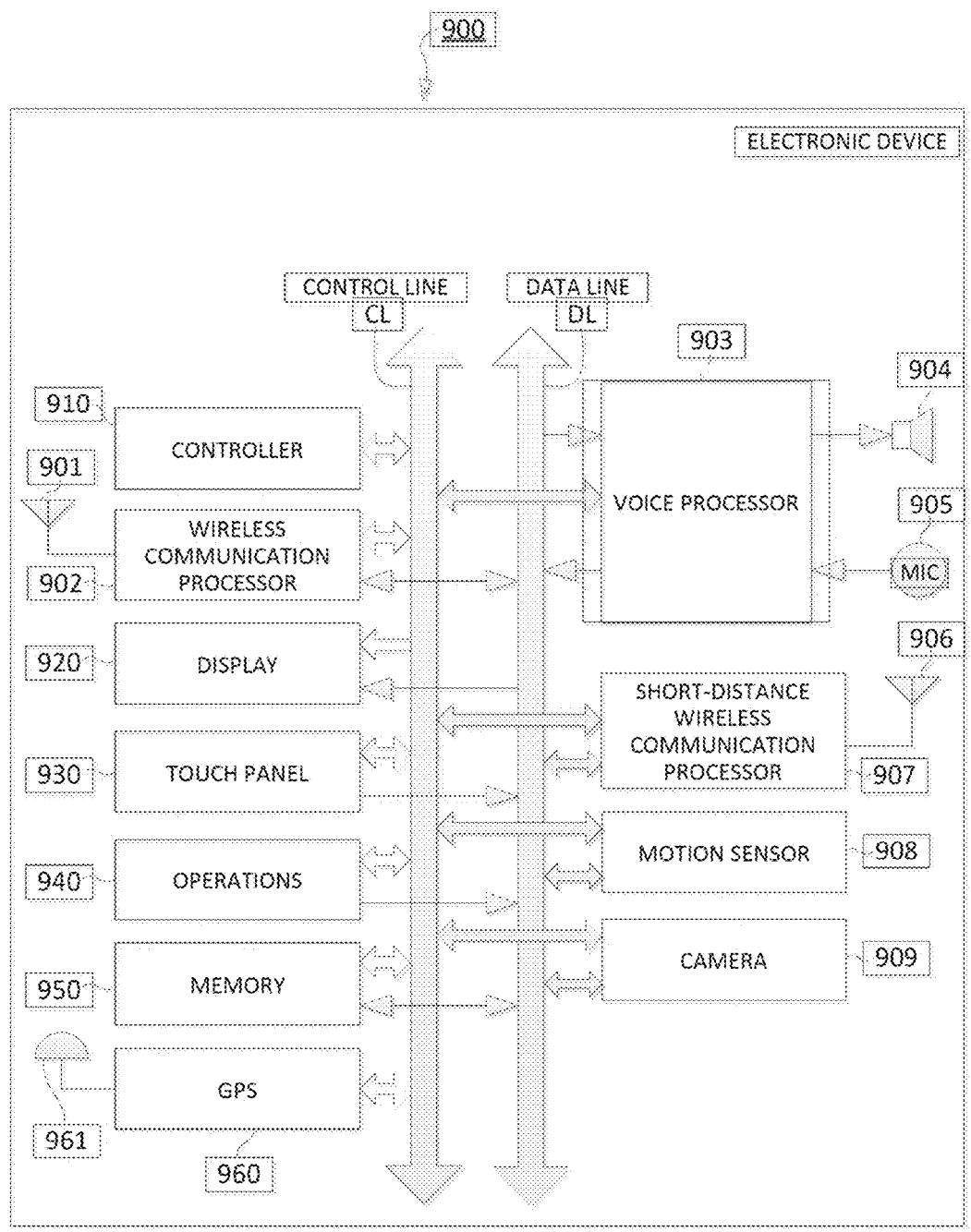
FIG. 9 is a block diagram illustrating an exemplary electronic device according to an embodiment.

FIG. 9 is a block diagram illustrating an exemplary electronic device used in accordance with embodiments of the present disclosure. In the embodiments, electronic device 900 can be a smartphone, a laptop, a tablet, a server, an e-reader, a camera, a navigation device, etc. Electronic device 900 could be used as one or more of the mobile client devices 120 illustrated in FIG. 1. Electronic device 900 could also be used as one or more of the sensor nodes 105 or the gateway sensor node 107 illustrated in FIG. 1.

The exemplary electronic device 900 of FIG. 9 includes a controller 910 and a wireless communication processor 902 connected to an antenna 901. A speaker 904 and a microphone 905 are connected to a voice processor 903. The controller 910 can include one or more Central Processing Units (CPUs), and can control each element in the electronic device 900 to perform functions related to communication control, audio signal processing, control for the audio signal processing, still and moving image processing and control, and other kinds of signal processing. The controller 910 can perform these functions by executing instructions stored in a memory 950. Alternatively or in addition to the local storage of the memory 950, the functions can be executed using instructions stored on an external device accessed on a network or on a non-transitory computer readable medium.

The memory 950 includes but is not limited to Read Only Memory (ROM), Random Access Memory (RAM), or a memory array including a combination of volatile and non-volatile memory units. The memory 950 can be utilized as working memory by the controller 910 while executing the processes and algorithms of the present disclosure. Additionally, the memory 950 can be used for long-term storage, e.g., of image data and information related thereto.

The electronic device 900 includes a control line CL and data line DL as internal communication bus lines. Control data to/from the controller 910 can be transmitted through the control line CL. The data line DL can be used for transmission of voice data, display data, etc.

The antenna 901 transmits/receives electromagnetic wave signals between base stations for performing radio-based communication, such as the various forms of cellular telephone communication. The wireless communication processor 902 controls the communication performed between the electronic device 900 and other external devices via the antenna 901. For example, the wireless communication processor 902 can control communication between base stations for cellular phone communication.

The speaker 904 emits an audio signal corresponding to audio data supplied from the voice processor 903. The microphone 905 detects surrounding audio and converts the detected audio into an audio signal. The audio signal can then be output to the voice processor 903 for further processing. The voice processor 903 demodulates and/or decodes the audio data read from the memory 950 or audio data received by the wireless communication processor 902 and/or a short-distance wireless communication processor 907. Additionally, the voice processor 903 can decode audio signals obtained by the microphone 905.

The exemplary electronic device 900 can also include a display 920, a touch panel 930, an operations key 940, and a short-distance communication processor 907 connected to an antenna 906. The display 920 can be a Liquid Crystal Display (LCD), an organic electroluminescence display panel, or another display screen technology. In addition to displaying still and moving image data, the display 920 can display operational inputs, such as numbers or icons which can be used for control of the electronic device 900. The display 920 can additionally display a GUI for a user to control aspects of the electronic device 900 and/or other devices. Further, the display 920 can display characters and images received by the electronic device 900 and/or stored in the memory 950 or accessed from an external device on a network. For example, the electronic device 900 can access a network such as the Internet and display text and/or images transmitted from a Web server.

The touch panel 930 can include a physical touch panel display screen and a touch panel driver. The touch panel 930 can include one or more touch sensors for detecting an input operation on an operation surface of the touch panel display screen. The touch panel 930 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 930 can detect when the stylus approaches/contacts the operation surface of the touch panel display (similar to the case in which a finger is used for the touch operation).

According to aspects of the present disclosure, the touch panel 930 can be disposed adjacent to the display 920 (e.g., laminated) or can be formed integrally with the display 920. For simplicity, the present disclosure assumes the touch panel 930 is formed integrally with the display 920 and therefore, examples discussed herein can describe touch operations being performed on the surface of the display 920 rather than the touch panel 930. However, the skilled artisan will appreciate that this is not limiting.

For simplicity, the present disclosure assumes the touch panel 930 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 930 can include transparent electrode touch sensors arranged in the X-Y direction on the surface of transparent sensor glass.

The touch panel driver can be included in the touch panel 930 for control processing related to the touch panel 930, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 930 and the display 920 can be surrounded by a protective casing, which can also enclose the other elements included in the electronic device 900. According to aspects of the disclosure, a position of the user's fingers on the protective casing (but not directly on the surface of the display 920) can be detected by the touch panel 930 sensors. Accordingly, the controller 910 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 910 can be configured to detect which hand is holding the electronic device 900, based on the detected finger position. For example, the touch panel 930 sensors can detect a plurality of fingers on the left side of the electronic device 900 (e.g., on an edge of the display 920 or on the protective casing), and detect a single finger on the right side of the electronic device 900. In this exemplary scenario, the controller 910 can determine that the user is holding the electronic device 900 with his/her right hand because the detected grip pattern corresponds to an expected pattern when the electronic device 900 is held only with the right hand.

The operation key 940 can include one or more buttons or similar external control elements, which can generate an operation signal based on a detected input by the user. In addition to outputs from the touch panel 930, these operation signals can be supplied to the controller 910 for performing related processing and control. According to aspects of the disclosure, the processing and/or functions associated with external buttons and the like can be performed by the controller 910 in response to an input operation on the touch panel 930 display screen rather than the external button, key, etc. In this way, external buttons on the electronic device 900 can be eliminated in lieu of performing inputs via touch operations, thereby improving water-tightness.

The antenna 906 can transmit/receive electromagnetic wave signals to/from other external apparatuses, and the short-distance wireless communication processor 907 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 907.

The electronic device 900 can include a motion sensor 908. The motion sensor 908 can detect features of motion (i.e., one or more movements) of the electronic device 900. For example, the motion sensor 908 can include an accelerometer to detect acceleration, a gyroscope to detect angular velocity, a geomagnetic sensor to detect direction, a geo-location sensor to detect location, etc., or a combination thereof to detect motion of the electronic device 900. According to aspects of the disclosure, the motion sensor 908 can generate a detection signal that includes data representing the detected motion. For example, the motion sensor 908 can determine a number of distinct movements in a motion (e.g., from start of the series of movements to the stop, within a predetermined time interval, etc.), a number of physical shocks on the electronic device 900 (e.g., a jarring, hitting, etc., of the electronic device 900), a speed and/or acceleration of the motion (instantaneous and/or temporal), or other motion features. The detected motion features can be included in the generated detection signal. The detection signal can be transmitted, e.g., to the controller 910, whereby further processing can be performed based on data included in the detection signal. The motion sensor 908 can work in conjunction with a Global Positioning System (GPS) 960. The GPS 960 detects the present position of the electronic device 900. The information of the present position detected by the GPS 960 is transmitted to the controller 910. An antenna 961 is connected to the GPS 960 for receiving and transmitting signals to and from a GPS satellite.

Electronic device 900 can include a camera 909, which includes a lens and shutter for capturing photographs of the surroundings around the electronic device 900. In an embodiment, the camera 909 captures surroundings of an opposite side of the electronic device 900 from the user. The images of the captured photographs can be displayed on the display panel 920. A memory saves the captured photographs. The memory can reside within the camera 909 or it can be part of the memory 950. The camera 909 can be a separate feature attached to the electronic device 900 or it can be a built-in camera feature.

Figure 10:
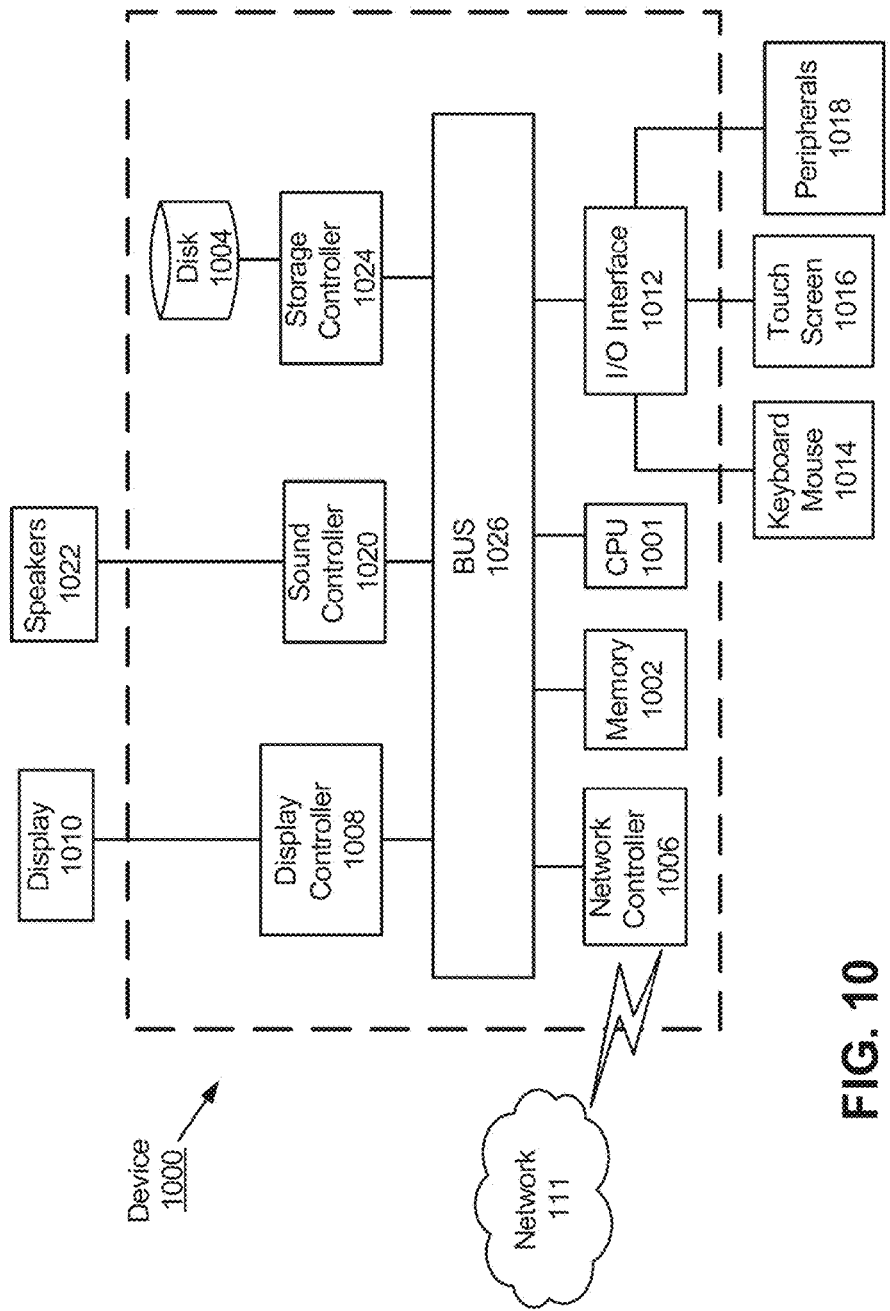
FIG. 10 is a block diagram illustrating an exemplary computing device according to an embodiment.

A hardware description of an exemplary computing device 1000 used in accordance with some embodiments described herein is given with reference to FIG. 10. Features described above with reference to electronic device 900 of FIG. 9 can be included in the computing device 1000 described below. Computing device 1000 could be used as one or more of the client devices 120 or the server(s) 110 illustrated in FIG. 1. Computing device 1000 could also be used as one or more of the sensor nodes 105 or the gateway sensor node 107 illustrated in FIG. 1.

In FIG. 10, the computing device 1000 includes a CPU 1001 which performs the processes described above and herein after. The process data and instructions can be stored in memory 1002. These processes and instructions can also be stored on a storage medium disk 1004 such as a hard drive (HDD) or portable storage medium or can be stored remotely. Further, the claimed features are not limited by the form of the computer-readable media on which the instructions of the process are stored. For example, the instructions can be stored on CDs, DVDs, in FLASH memory, RAM, ROM, PROM, EPROM, EEPROM, hard disk or any other information processing device with which the computing device 1000 communicates, such as a server or computer.

Further, the claimed features can be provided as a utility application, background daemon, or component of an operating system, or combination thereof, executing in conjunction with CPU 1001 and an operating system such as Microsoft Windows, UNIX, Solaris, LINUX, Apple MAC-OS and other systems known to those skilled in the art.

The hardware elements in order to achieve the computing device 1000 can be realized by various circuitry elements, known to those skilled in the art. For example, CPU 1001 can be a Xenon or Core processor from Intel of America or an Opteron processor from AMD of America, or can be other processor types that would be recognized by one of ordinary skill in the art. Alternatively, the CPU 1001 can be implemented on an FPGA, ASIC, PLD or using discrete logic circuits, as one of ordinary skill in the art would recognize. Further, CPU 1001 can be implemented as multiple processors cooperatively working in parallel to perform the instructions of the inventive processes described above and below.

The computing device 1000 in FIG. 10 also includes a network controller 1006, such as an Intel Ethernet PRO network interface card from Intel Corporation of America, for interfacing with network 111. As can be appreciated, the network 111 can be a public network, such as the Internet, or a private network such as an LAN or WAN network, or any combination thereof and can also include PSTN or ISDN sub-networks. The network 111 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 1000 further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. Touch screen panel 1016 includes features described above with reference to touch panel 930 of FIG. 9. General purpose I/O interface 1012 also connects to a variety of peripherals 1018 including printers and scanners, such as an OfficeJet or DeskJet from Hewlett Packard.

A sound controller 1020 is also provided in the computing device 1000, such as Sound Blaster X-Fi Titanium from Creative, to interface with speakers/microphone 1022 thereby providing sounds and/or music.

The general purpose storage controller 1024 connects the storage medium disk 1004 with communication bus 1026, which can be an ISA, EISA, VESA, PCI, or similar, for interconnecting all of the components of the computing device 1000. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 11. The chipset of FIG. 11 can be implemented in conjunction with either electronic device 900 or computing device 1000 described above with reference to FIGS. 9 and 10, respectively.

Figure 11:
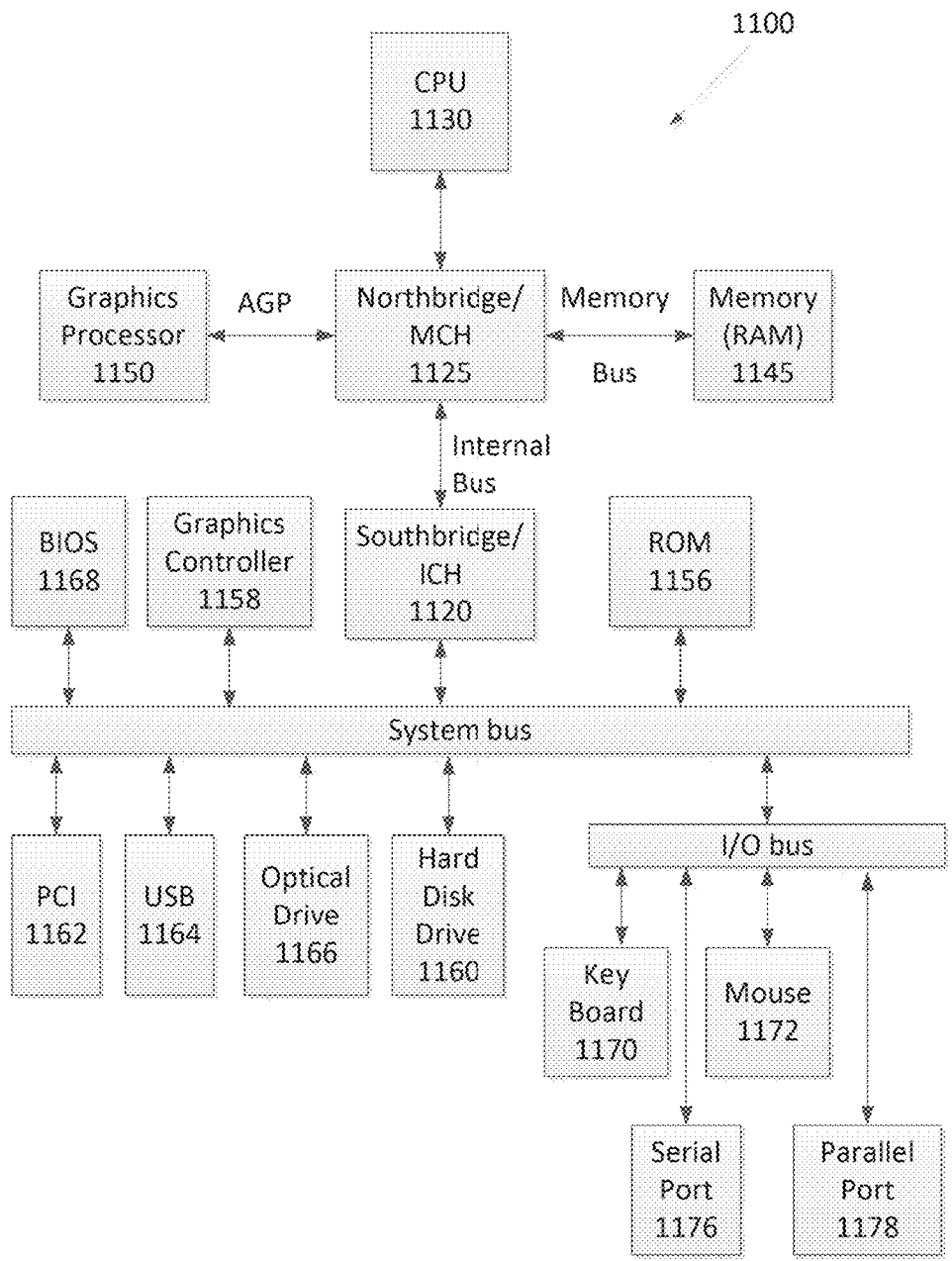
FIG. 11 is a block diagram illustrating an exemplary chipset according to an embodiment.

FIG. 11 shows a schematic diagram of a data processing system, according to aspects of the disclosure described herein for performing menu navigation, as described above. The data processing system is an example of a computer in which code or instructions implementing the processes of the illustrative embodiments can be located.

In FIG. 11, data processing system 1100 employs an application architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU 1130 can contain one or more processors and even can be implemented using one or more heterogeneous processor systems.

Figure 12:
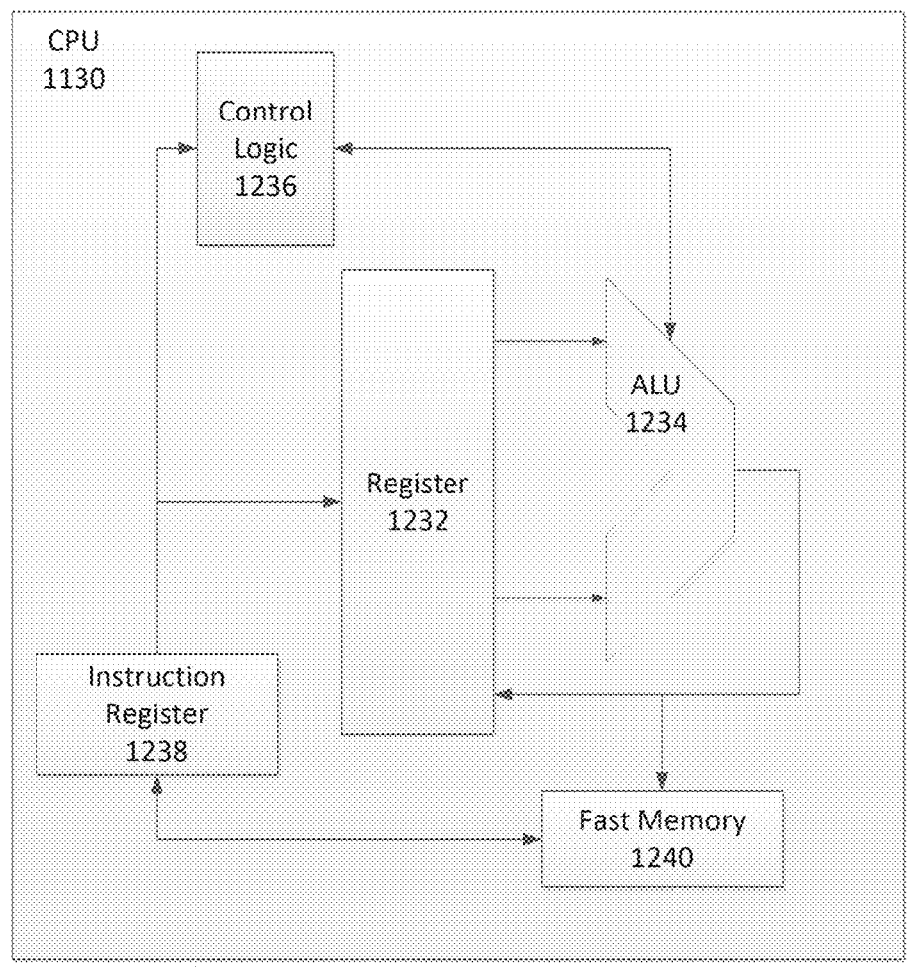
FIG. 12 is a block diagram illustrating an exemplary CPU of a chipset according to an embodiment.

For example, FIG. 12 shows one implementation of CPU 1130. In one implementation, an instruction register 1238 retrieves instructions from a fast memory 1240. At least part of these instructions are fetched from an instruction register 1238 by a control logic 1236 and interpreted according to the instruction set architecture of the CPU 1130. Part of the instructions can also be directed to a register 1232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 1234 that loads values from the register 1232 and performs logical and mathematical operations on the loaded values according to the instructions. The results from these operations can be fed back into the register 1232 and/or stored in a fast memory 1240. According to aspects of the disclosure, the instruction set architecture of the CPU 1130 can use a reduced instruction set computer (RISC), a complex instruction set computer (CISC), a vector processor architecture, or a very long instruction word (VLIW) architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 11, the data processing system 1100 can include the SB/ICH 1120 being coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices can include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

Distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 13:
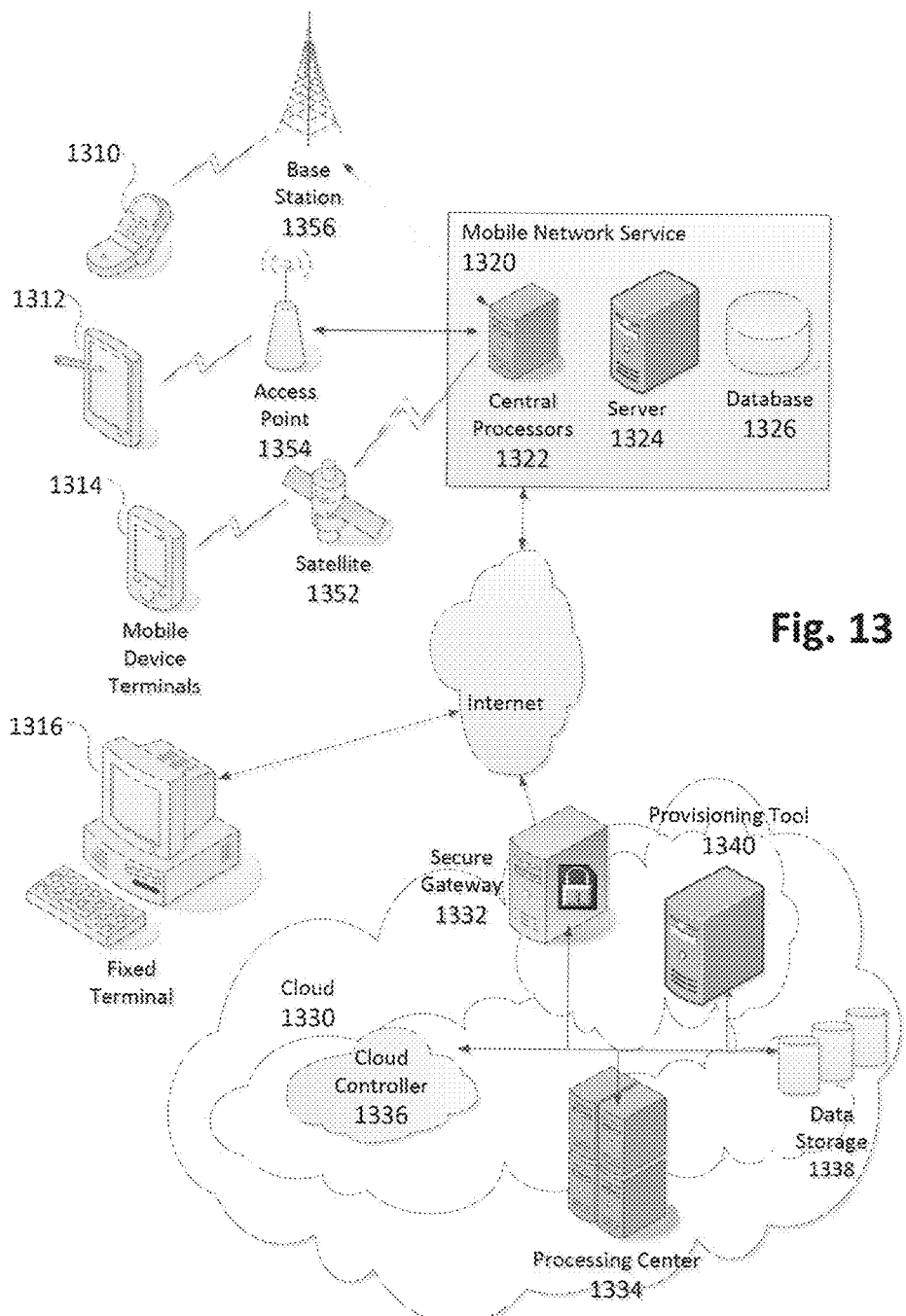
FIG. 13 illustrates an exemplary cloud computing system according to an embodiment.

FIG. 13 illustrates an example of a cloud computing system, wherein users access the cloud through mobile device terminals or fixed terminals that are connected to the Internet. One or more of the devices illustrated in the WSN architecture 100 of FIG. 1 could be used in the cloud computing system illustrated in FIG. 13.

The mobile device terminals can include a cell phone 1310, a tablet computer 1312, and a smartphone 1314, for example. The mobile device terminals can connect to a mobile network service 1320 through a wireless channel such as a base station 1356 (e.g., an Edge, 3G, 4G, or LTE Network), an access point 1354 (e.g., a femto cell or WiFi network), or a satellite connection 1352. In one implementation, signals from the wireless interface to the mobile device terminals (e.g., the base station 1356, the access point 1354, and the satellite connection 1352) are transmitted to a mobile network service 1320, such as an EnodeB and radio network controller, UMTS, or HSDPA/HSUPA. Mobile users' requests and information are transmitted to central processors 1322 that are connected to servers 1324 to provide mobile network services, for example. Further, mobile network operators can provide service to mobile users for authentication, authorization, and accounting based on home agent and subscribers' data stored in databases 1326, for example. The subscribers' requests are subsequently delivered to a cloud 1330 through the Internet.

A user can also access the cloud through a fixed terminal 1316, such as a desktop or laptop computer or workstation that is connected to the Internet via a wired network connection or a wireless network connection. The mobile network service 1320 can be a public or a private network such as an LAN or WAN network. The mobile network service 1320 can be wireless such as a cellular network including EDGE, 3G and 4G wireless cellular systems. The wireless mobile network service 1320 can also be Wi-Fi, Bluetooth, or any other wireless form of communication that is known.

The user's terminal, such as a mobile user terminal and a fixed user terminal, provides a mechanism to connect via the Internet to the cloud 1330 and to receive output from the cloud 1330, which is communicated and displayed at the user's terminal. In the cloud 1330, a cloud controller 1336 processes the request to provide users with the corresponding cloud services. These services are provided using the concepts of utility computing, virtualization, and service-oriented architecture.

In one implementation, the cloud 1330 is accessed via a user interface such as a secure gateway 1332. The secure gateway 1332 can for example, provide security policy enforcement points placed between cloud service consumers and cloud service providers to interject enterprise security policies as the cloud-based resources are accessed. Further, the secure gateway 1332 can consolidate multiple types of security policy enforcement, including for example, authentication, single sign-on, authorization, security token mapping, encryption, tokenization, logging, alerting, and API control. The cloud 1330 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1340 that prepares and equips the cloud resources, such as the processing center 1334 and data storage 1338 to provide services to the users of the cloud 1330. The processing center 1334 can be a computer cluster, a data center, a main frame computer, or a server farm. In one implementation, the processing center 1334 and data storage 1338 are collocated.

Embodiments described herein can be implemented in conjunction with one or more of the devices described above with reference to FIGS. 9-13. Embodiments described herein are a combination of hardware and software, and circuitry by which the software is implemented.

The hardware description above, exemplified by any one of the structural examples illustrated in FIG. 9, 10, or 11, constitutes or includes specialized corresponding structure that is programmed or configured to perform the algorithms illustrated in FIGS. 7 and 8. For example, the algorithms illustrated in FIGS. 7 and 8 may be completely performed by the circuitry included in the single device illustrated in FIG. 9 or 10, or the chipset as illustrated in FIG. 11, or the algorithms may be completely performed in a shared manner distributed over the circuitry of any plurality of the devices illustrated in FIG. 13.

Various problems have been researched in energy-harvesting WSNs. See W. K. Seah, Z. A. Eu, and H.-P. Tan, "Wireless sensor networks powered by ambient energy harvesting (WSN-HEAP)-Survey and challenges," in *proc. of IEEE Wireless VITAE'09*, 2009, incorporated herein by reference in its entirety. Problems included minimizing the packet end-to-end delay and maximizing the throughput. Embodiments herein describe a DEECP algorithm to collect the data from sensor nodes based on its energy, energy harvesting rate, packet data rate, and node capability. The DEECP algorithm increases the flow throughput about 1148%, decreases the packet-loss ratio about 80%, and decreases the packet end-to-end delay about 65% in comparison with AODV protocol.

Embodiments described herein include the following aspects.

(1) A method of determining a data collection routing protocol includes the steps of sensing one or more beacon messages at a source sensor node from neighboring sensor nodes within a WSN; measuring, via the source sensor node a RSSI of the beacon messages from the neighboring sensor nodes; inputting the measured RSSI and data for an available energy, a harvested energy, a packet transmission energy, an energy harvesting rate, and a packet reception energy of the neighboring sensor nodes into a routing table stored in memory at the source sensor node; calculating a weighted RSSI for all entries of the routing table for child sensor nodes located at a lower sensor level from a source sensor node level; connecting the source sensor node to one of the child sensor nodes based upon the weighted RSSI and the data of the associated child sensor node; and connecting the source sensor node to a parent sensor node located within the source sensor node level when connecting the source sensor node to one of the child sensor nodes is not completed before a predetermined timeout.

(2) The method of (1), wherein the weighted RSSI is calculated from the measured RSSI, a correction factor for the measured RSSI, a level of the associated sensor node, and a weight of the level.

(3) The method of either (1) or (2), wherein a routing protocol of the WSN operates in a network layer of an OSI model expanded to a MAC layer.

(4) The method of any of (1) through (3), further including the steps of determining an available packet rate of the source sensor node from the data; retrieving and sending unused packet rate usage to the source sensor node when the available packet rate is lower than a packet rate assigned to one or more child sensor nodes; requesting a new parent sensor node when the retrieved unused packet rate usage is not adequate to extend a life of the source sensor node; and connecting the one or more child sensor nodes to the new parent sensor node.

(5) The method of any of (1) through (4), further including the step of inactivating the source sensor node for a predetermined time, based on a capability and applicable data rate of the source sensor node, to store adequate energy to support the one or more child sensor nodes.

(6) The method of any of (1) through (5), wherein the measured RSSI is based on an energy received from an intended transmission, a received external noise, and an energy received from concurrent interfering transmissions.

(7) The method of any of (1) through (6), further including the steps of activating the parent sensor node when the available energy for the parent sensor node is at least a predefined energy level; and leaving the parent sensor node in a sleep state when the available energy is less than the predefined energy level.

(8) The method of any of (1) through (7), wherein the available energy is a minimum packet rate needed by the parent sensor node to serve its children sensor nodes for a predetermined time window after being activated.

(9) A WSN, including processing circuitry configured to perceive one or more beacon messages from neighboring sensor nodes of a plurality of inter-connected sensor nodes of the WSN; measure a RSSI of the beacon messages from the neighboring sensor nodes; input the measured RSSI and data for an available energy, a harvested energy, a packet transmission energy, an energy harvesting rate, and a packet reception energy of the neighboring sensor nodes into a routing table of a source sensor node; calculate a weighted RSSI for all entries of the routing table for child sensor nodes located at a lower sensor level from a source sensor node level; connect the source sensor node to one of the child sensor nodes based upon the weighted RSSI and the data of the associated child sensor node; and connect the source sensor node to a parent sensor node located within the source sensor node level when connecting the source sensor node to one of the child sensor nodes is not completed before a predetermined timeout.

(10) The WSN of (9), wherein the weighted RSSI is calculated from the measured RSSI, a correction factor for the measured RSSI, a level of the associated sensor node, and a weight of the level.

(11) The WSN of either (9) or (10), wherein a routing protocol of the WSN operates in a network layer of an OSI model expanded to a MAC layer.

(12) The WSN of any of (9) through (11), wherein the processing circuitry is further configured to determine an available packet rate of the source sensor node from the data; retrieve and send unused packet rate usage to the source sensor node when the available packet rate is lower than a packet rate assigned to one or more child sensor nodes; request a new parent sensor node when the retrieved unused packet rate usage is not adequate to extend a life of the source sensor node; and connect the one or more child sensor nodes to the new parent sensor node.

(13) The WSN of any of (9) through (12), wherein the processing circuitry is further configured to inactivate the source sensor node for a predetermined time, based on a capability and applicable data rate of the source sensor node, to store adequate energy to support the one or more child sensor nodes.

(14) The WSN of any of (9) through (13), wherein the measured RSSI is based on an energy received from an intended transmission, a received external noise, and an energy received from concurrent interfering transmissions.

(15) The WSN of any of (9) through (14), wherein the plurality of inter-connected sensor nodes operate within a network layer of a communication system model for communication delivery between the plurality of inter-connected sensor nodes and a WSN server.

(16) The WSN of any of (9) through (15), wherein the processing circuitry is further configured to activate the parent sensor node when the available energy is at least a predefined energy level; and leave the parent sensor node in a sleep state when the available energy is less than the predefined energy level.

(17) The WSN of any of (9) through (16), wherein the available energy is a minimum packet rate needed by the parent sensor node to serve its children sensor nodes for a predetermined time window after being activated.

(18) A method of determining a data collection routing protocol includes the steps of perceiving a broadcast beacon message from an i-th sensor node located at an i-th sensor level by one or more sensor nodes at one or more other sensor levels of a divided WSN, wherein the i-th sensor level does not include a first sensor level of a sink sensor node; resetting the respective sensor level of the one or more sensor nodes to an (i+1)th sensor level; attempting to connect the i-th sensor node at the i-th sensor level to another sensor node located at an (i−1)th sensor level; and connecting the i-th sensor node to a parent sensor node at the i-th sensor level when the following conditions are met—a) the attempting is not completed before a predetermined timeout, b) the parent sensor node has a maximum RSSI, c) a hop count between the i-th sensor node and the parent sensor node does not exceed a maximum hop count, d) the parent sensor node has a higher packet rate than needed, and e) the parent sensor node has a connection to another sensor node within a destination of the i-th sensor node.

(19) The method of (18), wherein the attempting includes calculating a weighted RSSI of the broadcasted beacon message, and the connecting is based upon the calculated weighted RSSI.

(20) The method of either (18) or (19), wherein the weighted RSSI is calculated from a measured RSSI of the broadcasted beacon message, a correction factor for the measured RSSI, a level of the i-th sensor node, and a weight of the level.

While certain embodiments have been described herein, these embodiments are presented by way of example only, and are not intended to limit the scope of the disclosure. Using the teachings in this disclosure, a person having ordinary skill in the art could modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A method of determining a data collection routing protocol, the method comprising:
sensing one or more beacon messages at a source sensor node from neighboring sensor nodes within a wireless sensor network (WSN);
measuring, via the source sensor node a Received Signal Strength Indicator (RSSI) of the beacon messages from the neighboring sensor nodes;
inputting the measured RSSI and data for an available energy, a harvested energy, a packet transmission energy, an energy harvesting rate, and a packet reception energy of the neighboring sensor nodes into a routing table stored in memory at the source sensor node;
calculating a weighted RSSI for all entries of the routing table for child sensor nodes located at a lower sensor level from a source sensor node level;
connecting the source sensor node to one of the child sensor nodes based upon the weighted RSSI and the data of the associated child sensor node; and
connecting the source sensor node to a parent sensor node located within the source sensor node level when connecting the source sensor node to one of the child sensor nodes is not completed before a predetermined timeout.

2. The method of claim 1, wherein the weighted RSSI is calculated from the measured RSSI, a correction factor for the measured RSSI, a level of the associated sensor node, and a weight of the level.

3. The method of claim 1, wherein a routing protocol of the WSN operates in a network layer of an Open Systems Interconnection (OSI) model expanded to a Media Access Control (MAC) layer.

4. The method of claim 1, further comprising:
determining an available packet rate of the source sensor node from the data;
retrieving and sending unused packet rate usage to the source sensor node when the available packet rate is lower than a packet rate assigned to one or more child sensor nodes;
requesting a new parent sensor node when the retrieved unused packet rate usage is not adequate to extend a life of the source sensor node; and
connecting the one or more child sensor nodes to the new parent sensor node.

5. The method of claim 1, further comprising:
inactivating the source sensor node for a predetermined time, based on a capability and applicable data rate of the source sensor node, to store adequate energy to support the one or more child sensor nodes.

6. The method of claim 1, wherein the measured RSSI is based on an energy received from an intended transmission, a received external noise, and an energy received from concurrent interfering transmissions.

7. The method of claim 1, further comprising:
activating the parent sensor node when the available energy for the parent sensor node is at least a predefined energy level; and
leaving the parent sensor node in a sleep state when the available energy is less than the predefined energy level.

8. The method of claim 7, wherein the available energy is a minimum packet rate needed by the parent sensor node to serve its children sensor nodes for a predetermined time window after being activated.

9. A wireless sensor network (WSN), comprising:
processing circuitry configured to
perceive one or more beacon messages from neighboring sensor nodes of a plurality of inter-connected sensor nodes of the WSN,
measure a Received Signal Strength Indicator (RSSI) of the beacon messages from the neighboring sensor nodes,
input the measured RSSI and data for an available energy, a harvested energy, a packet transmission energy, an energy harvesting rate, and a packet reception energy of the neighboring sensor nodes into a routing table of a source sensor node,
calculate a weighted RSSI for all entries of the routing table for child sensor nodes located at a lower sensor level from a source sensor node level,
connect the source sensor node to one of the child sensor nodes based upon the weighted RSSI and the data of the associated child sensor node, and
connect the source sensor node to a parent sensor node located within the source sensor node level when connecting the source sensor node to one of the child sensor nodes is not completed before a predetermined timeout.

10. The WSN of claim 9, wherein the weighted RSSI is calculated from the measured RSSI, a correction factor for the measured RSSI, a level of the associated sensor node, and a weight of the level.

11. The WSN of claim 9, wherein a routing protocol of the WSN operates in a network layer of an Open Systems Interconnection (OSI) model expanded to a Media Access Control (MAC) layer.

12. The WSN of claim 9, wherein the processing circuitry is further configured to:
   determine an available packet rate of the source sensor node from the data;
   retrieve and send unused packet rate usage to the source sensor node when the available packet rate is lower than a packet rate assigned to one or more child sensor nodes;
   request a new parent sensor node when the retrieved unused packet rate usage is not adequate to extend a life of the source sensor node; and
   connect the one or more child sensor nodes to the new parent sensor node.

13. The WSN of claim 9, wherein the processing circuitry is further configured to inactivate the source sensor node for a predetermined time, based on a capability and applicable data rate of the source sensor node, to store adequate energy to support the one or more child sensor nodes.

14. The WSN of claim 9, wherein the measured RSSI is based on an energy received from an intended transmission, a received external noise, and an energy received from concurrent interfering transmissions.

15. The WSN of claim 9, wherein the plurality of inter-connected sensor nodes operate within a network layer of a communication system model for communication delivery between the plurality of inter-connected sensor nodes and a WSN server of the WSN.

16. The WSN of claim 9, wherein the processing circuitry is further configured to
   activate the parent sensor node when the available energy is at least a predefined energy level; and
   leave the parent sensor node in a sleep state when the available energy is less than the predefined energy level.

17. The WSN of claim 16, wherein the available energy is a minimum packet rate needed by the parent sensor node to serve its children sensor nodes for a predetermined time window after being activated.

18. A method of determining a data collection routing protocol, the method comprising:
   perceiving a broadcast beacon message from an i-th sensor node located at an i-th sensor level by one or more sensor nodes at one or more other sensor levels of a divided wireless sensor network (WSN), wherein the i-th sensor level does not include a first sensor level of a sink sensor node;
   resetting the respective sensor level of the one or more sensor nodes to an (i+1)th sensor level;
   attempting to connect the i-th sensor node at the i-th sensor level to another sensor node located at an (i−1)th sensor level; and
   connecting the i-th sensor node to a parent sensor node at the i-th sensor level when
      the attempting is not completed before a predetermined timeout,
      the parent sensor node has a maximum received signal strength indicator (RSSI),
      a hop count between the i-th sensor node and the parent sensor node does not exceed a maximum hop count,
      the parent sensor node has a higher packet rate than needed, and
      the parent sensor node has a connection to another sensor node within a destination of the i-th sensor node.

19. The method of claim 18, wherein the attempting includes calculating a weighted Received Signal Strength Indicator (RSSI) of the broadcasted beacon message, and the connecting is based upon the calculated weighted RSSI.

20. The method of claim 19, wherein the weighted RSSI is calculated from a measured RSSI of the broadcasted beacon message, a correction factor for the measured RSSI, a level of the i-th sensor node, and a weight of the level.

* * * * *